United States Patent [19]
Klinner

[11] Patent Number: 4,790,128
[45] Date of Patent: * Dec. 13, 1988

[54] CROP HARVESTING APPARATUS AND METHODS

[75] Inventor: Wilfred E. Klinner, Milton Keynes, United Kingdom

[73] Assignee: National Research Development Corporation, London, England

[*] Notice: The portion of the term of this patent subsequent to Oct. 8, 2002 has been disclaimed.

[21] Appl. No.: 879,109

[22] PCT Filed: Sep. 26, 1985

[86] PCT No.: PCT/GB85/00442
  § 371 Date: May 27, 1986
  § 102(e) Date: May 27, 1986

[87] PCT Pub. No.: WO86/01972
  PCT Pub. Date: Apr. 10, 1986

[30] Foreign Application Priority Data

Sep. 27, 1984 [GB] United Kingdom ............... 8424396

[51] Int. Cl.⁴ .................... A01D 82/00; A01D 65/02; A01D 89/00
[52] U.S. Cl. ................................ 56/364; 56/DIG. 1
[58] Field of Search ........................... 56/364, DIG. 1

[56] References Cited

U.S. PATENT DOCUMENTS

| | | |
|---|---|---|
| 1,418,542 | 6/1922 | Dill . |
| 2,231,354 | 2/1941 | Wilcox . |
| 2,460,029 | 1/1949 | Ramp . |
| 3,184,905 | 5/1965 | Hillier . |
| 3,676,988 | 7/1972 | Hauser-Lienhard ............... 56/364 |
| 3,772,860 | 11/1973 | Weiberg ............... 56/130 |
| 4,021,995 | 5/1977 | Hill ............... 56/DIG. 1 |
| 4,035,992 | 7/1977 | Moosbrucker et al. ............... 56/1 |
| 4,055,037 | 10/1977 | Oosterling et al. ............... 56/DIG. 1 |
| 4,255,923 | 3/1981 | Spaida et al. ............... 56/364 |
| 4,313,296 | 7/1982 | Mitchell, Jr. et al. ............... 56/130 |
| 4,373,322 | 2/1983 | Beisil ............... 56/126 |
| 4,512,146 | 4/1985 | Klinner ............... 56/364 |
| 4,545,188 | 10/1985 | Klinner ............... 56/364 |
| 4,578,937 | 4/1986 | West et al. . |
| 4,581,880 | 4/1986 | Klinner ............... 56/364 |
| 4,597,252 | 7/1986 | Williams ............... 56/130 |

FOREIGN PATENT DOCUMENTS

| | | |
|---|---|---|
| 217670 | 10/1958 | Australia . |
| 1107599 | 8/1981 | Canada . |
| 92824 | 4/1983 | European Pat. Off. . |
| 94036 | 5/1983 | European Pat. Off. . |
| 162431 | 5/1985 | European Pat. Off. . |
| 89653 | 5/1897 | Fed. Rep. of Germany . |
| 3318554 | 11/1984 | Fed. Rep. of Germany . |
| 737261 | 12/1932 | France . |
| 994505 | 11/1951 | France . |
| 15204 | 3/1926 | Netherlands . |
| 7903397 | 11/1980 | Netherlands . |
| 898989 | 7/1982 | U.S.S.R. . |
| 572040 | 9/1945 | United Kingdom . |
| 976171 | 11/1964 | United Kingdom . |
| 2003715 | 3/1979 | United Kingdom . |
| 1580359 | 12/1980 | United Kingdom . |
| 2099272 | 12/1982 | United Kingdom . |
| 2117214 | 10/1983 | United Kingdom . |

OTHER PUBLICATIONS

Machinisme Agricole Tropical-No. 83 20-34 55 (1983).
Mekhanizatsiya i Elektrifikatsiya Sel'skogo Khozyaistva, 9, 30-31 (1984).

Primary Examiner—Paul J. Hirsch
Attorney, Agent, or Firm—Cushman, Darby & Cushman

[57] ABSTRACT

Apparatus for harvesting crop comprises a rotor (11) mounted on a mobile frame (12) and carries a succession of transverse combs (14) each formed of an array of outwardly projecting teeth (15) transverse to the direction of movement of the apparatus through the crop. Each tooth (15) is pointed with side edges diverging away from the distal tip of the tooth. The rotor rotates in the overshot mode and the combs intrude into the crop and gather crop stems between adjacent pairs of teeth and detach grain and grain heads, or other required crop parts, by rubbing or breaking the parts free from the stems. The junction of adjacent teeth (15) preferably has an enlarged aperture (21) to assist stripping and to allow withdrawal of stripped stems. In other arrangements the teeth may be replaced by a brush-like structure or by rods or other crop engaging elements, backed by plain transverse ribs for collecting and conveying detached crop parts.

16 Claims, 31 Drawing Sheets

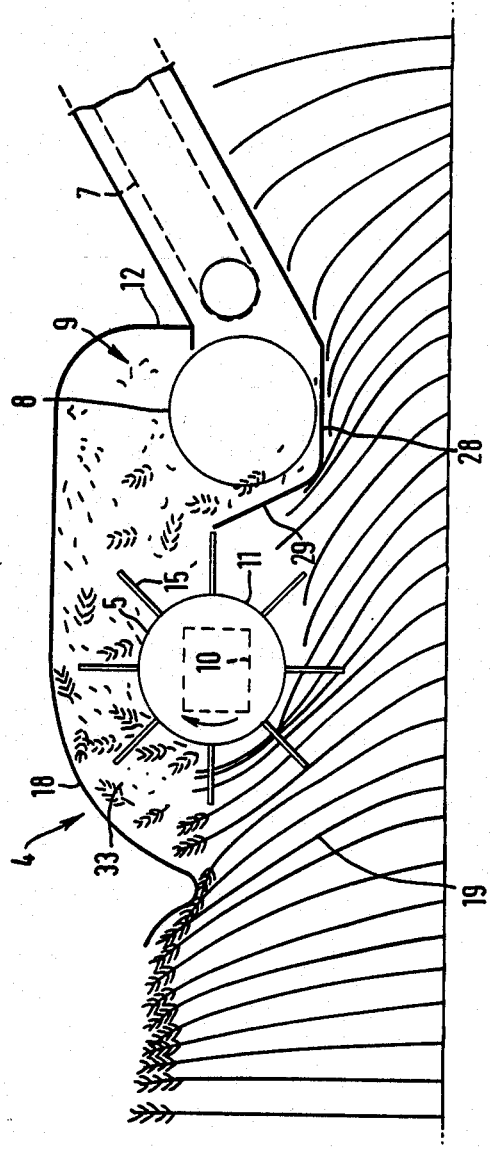

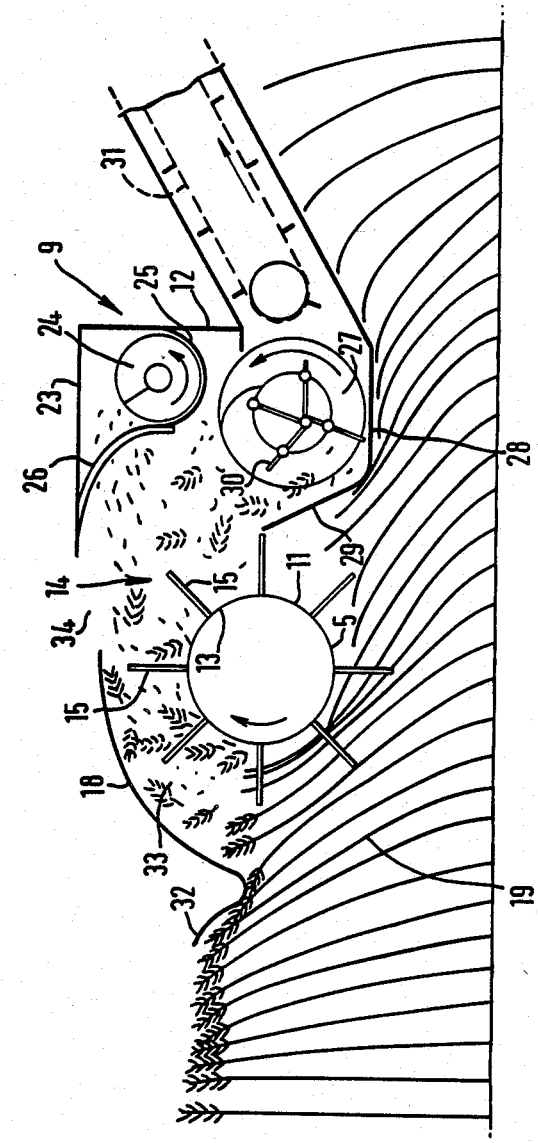

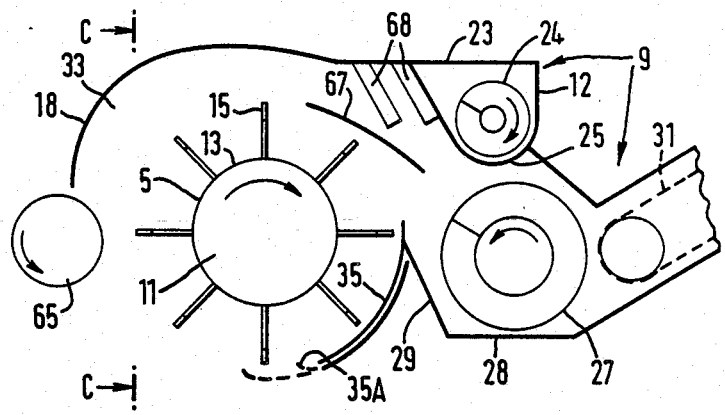
FIG. 6a.
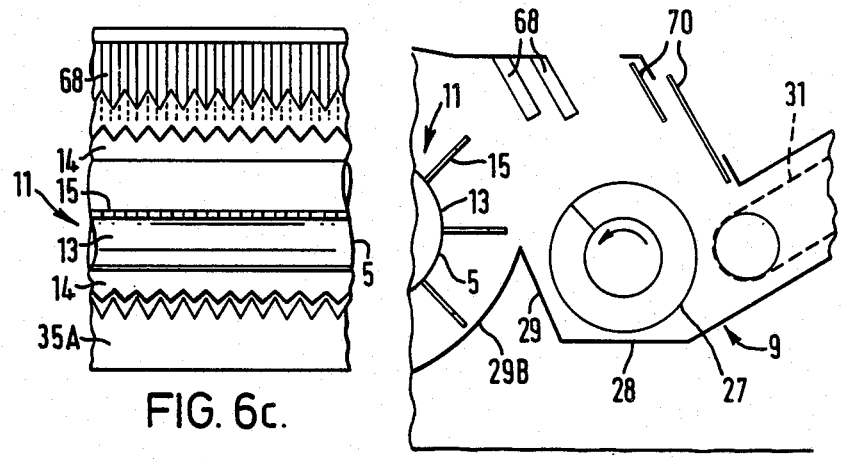
FIG. 6c.
FIG. 6b.

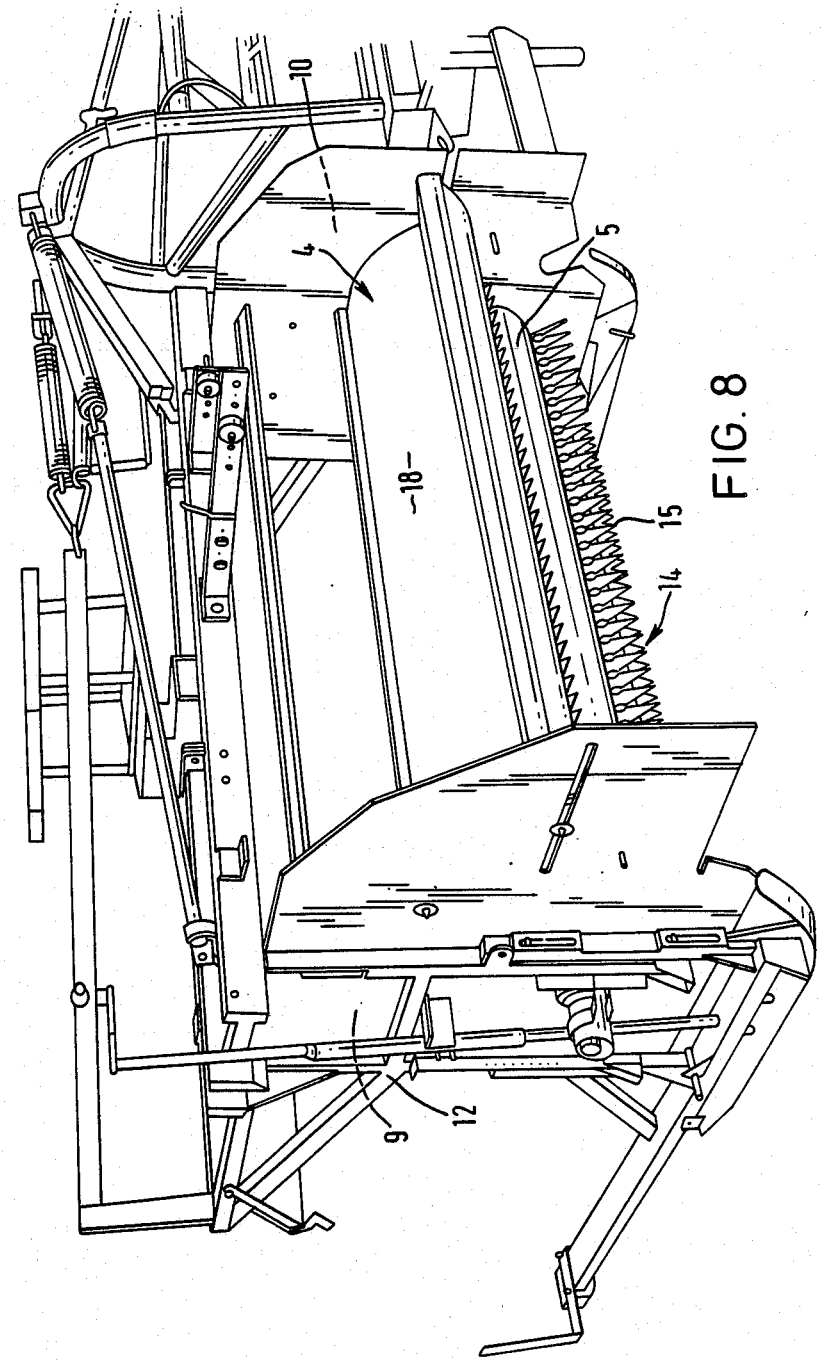

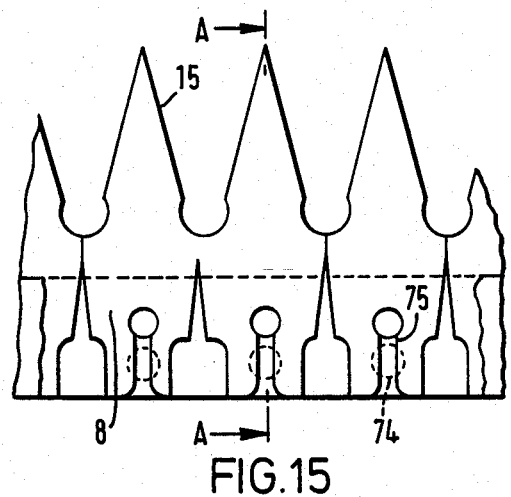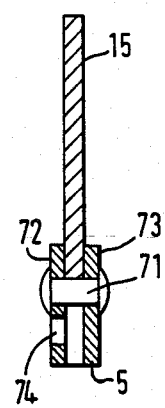
FIG.15    FIG.15a
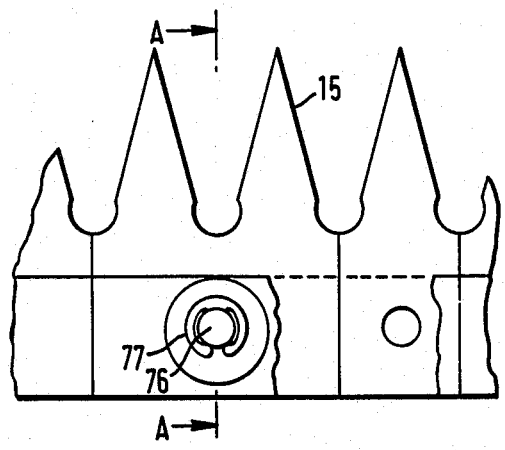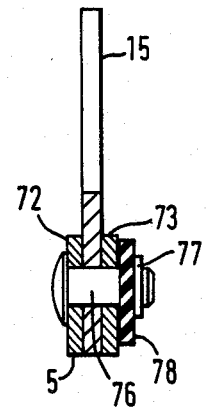
FIG.16    FIG.16a

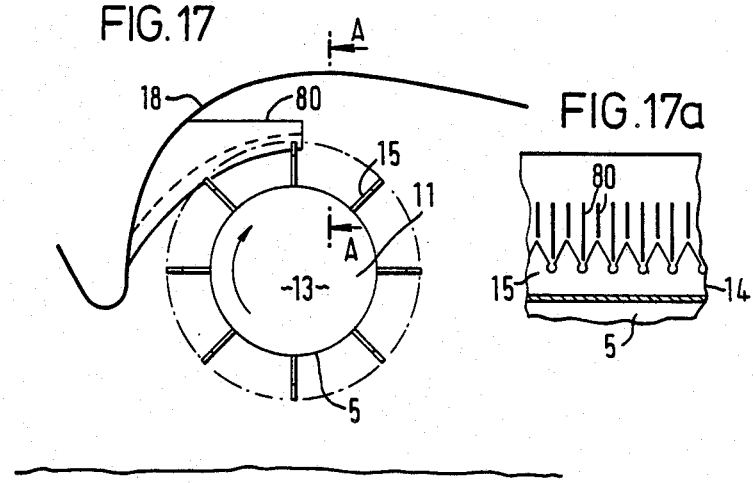
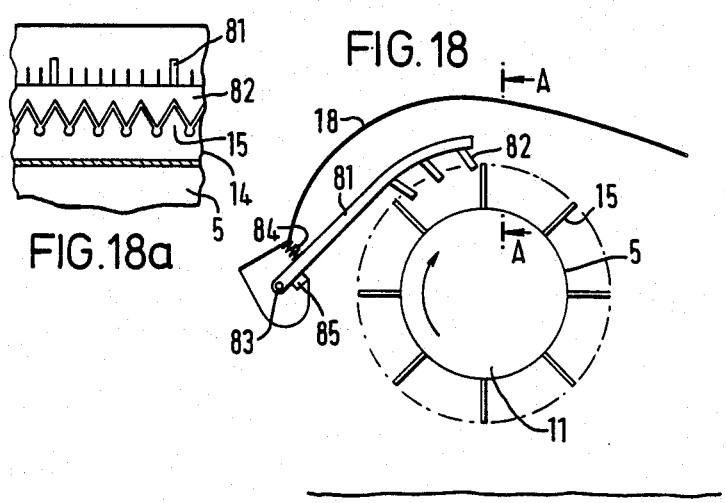

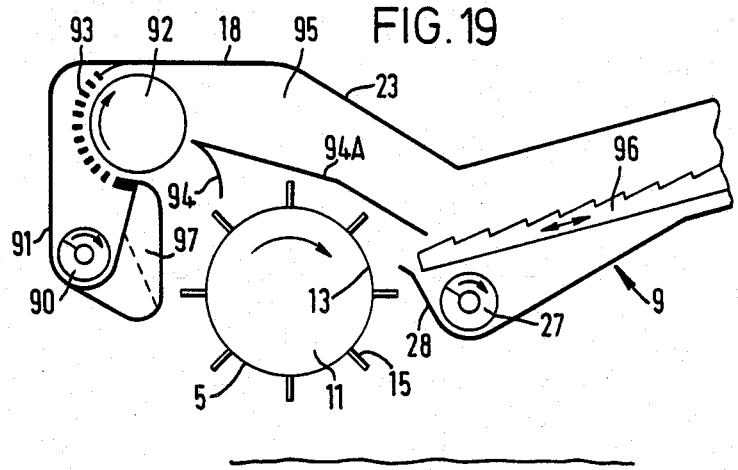
FIG. 19
FIG. 19a
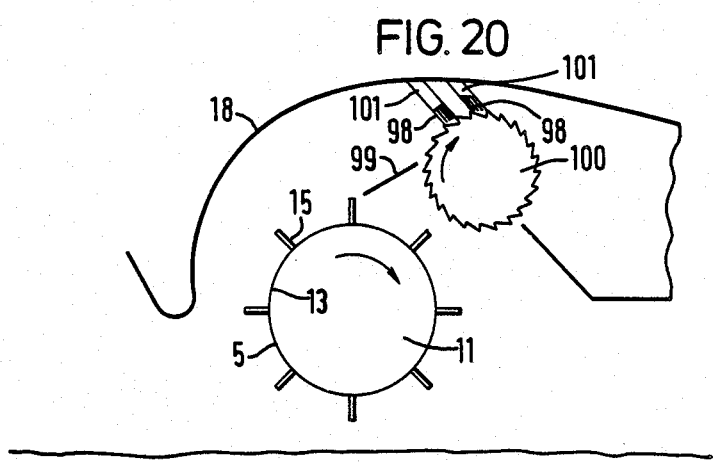
FIG. 20

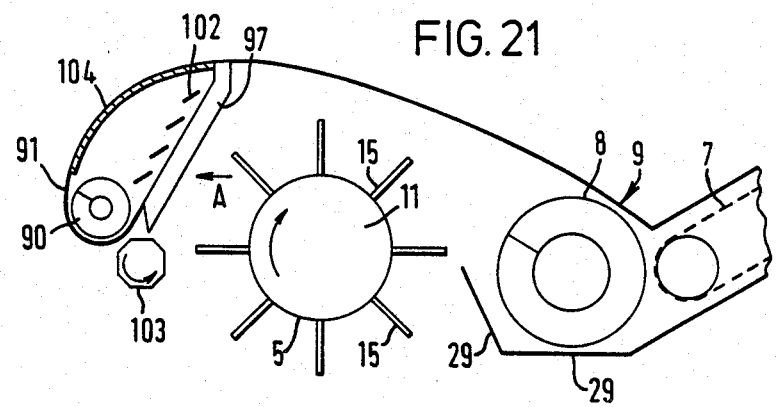
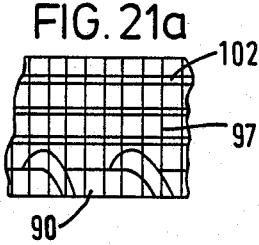
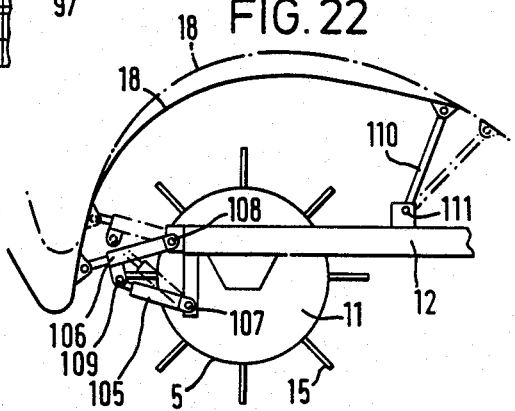

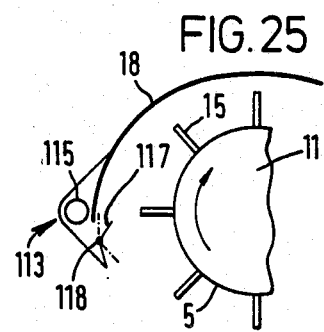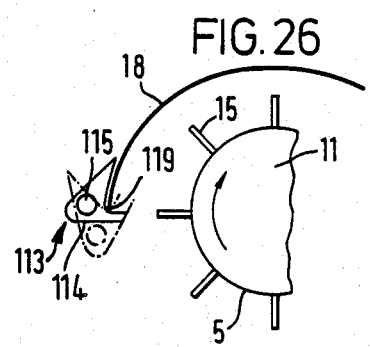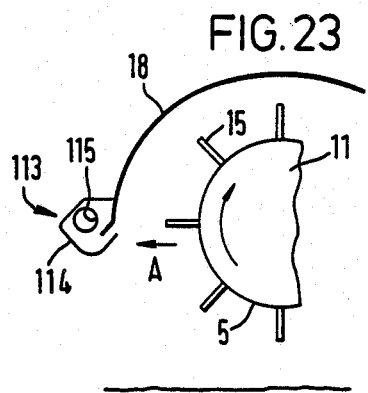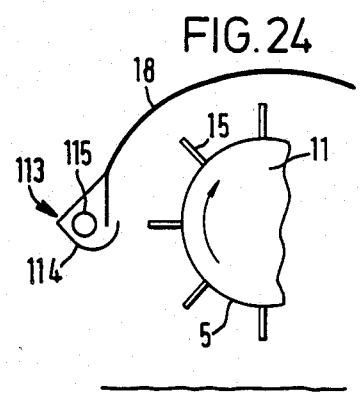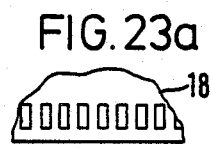

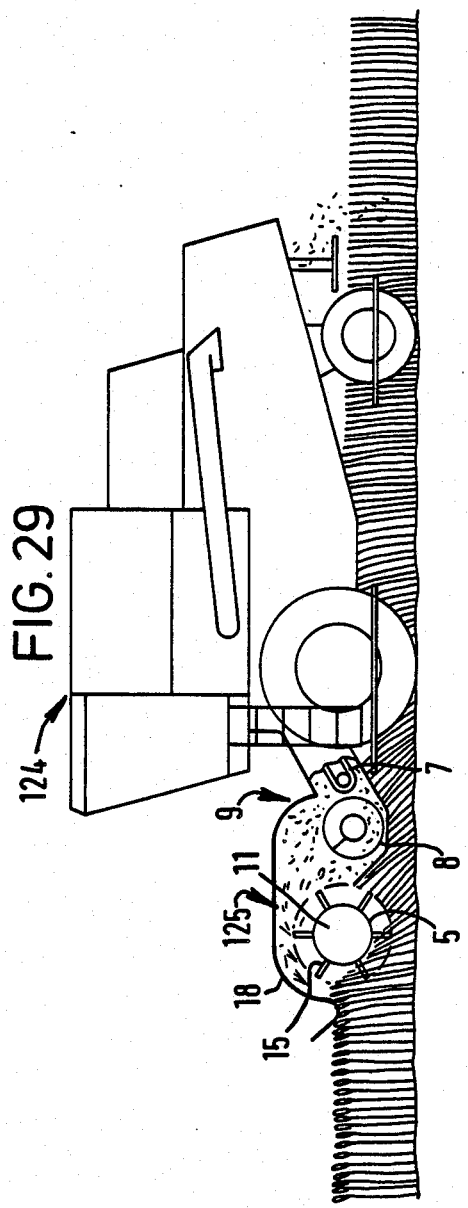

CROP HARVESTING APPARATUS AND METHODS

The present invention relates to apparatus for, and methods of, harvesting crop. The invention is concerned with detaching from the stems or other plant parts of standing crop, seeds, seed-bearing parts, leaves, twigs, flowers, or other predetermined required portion of the crop, collecting the required portion, and leaving the remaining stripped parts of the crop standing in the field. The invention has particular but not exclusive application in the harvesting of grain crops, such as wheat, oats, barley, and rice. The invention also has application in the stripping of leaves, young shoots, and sometimes blossom from crops. Examples include lucerne (alfalfa) leaves for protein production, and the leaves and flowers of herbs and other crops used for the extraction of essential oils and other constituents.

It is an object of the present invention to provide improved apparatus for and methods of stripping required parts from a standing crop, usually the most valuable parts of the crop, namely the seed, leaves, and/or flowers. It is an object of the invention to overcome many of the disadvantages of known harvesting methods and devices, and to simplify, hasten and make less expensive the harvesting process. It is a further object to make less weather dependent the disposal or harvesting of the remaining crop which is left standing in the field.

According to the present invention in a broad aspect, there is provided apparatus for harvesting crop comprising a mobile frame for movement over the ground; moveable support means mounted for driven movement relative to the frame; a plurality of outwardly protecting crop engaging elements mounted on the moveable support means; guide means co-operating with the crop engaging elements to form a crop flow passage; and drive means for driving the moveable support means to carry the elements upwardly and rearwardly at a front region of the apparatus so as to detach from standing crop predetermined required parts of the crop and to move the detached crop parts along the crop flow passage.

The invention encompasses apparatus for detaching from the stems or other plant parts of standing crop, seeds, seed-bearing parts, leaves, twigs, flowers and/or other predetermined required parts of the crop, by rubbing and/or breaking and/or tearing the parts from the stems.

By the term standing crop is meant crop in the field before any harvesting operation has been carried out on it, for example before any cutting operation, and the term standing crop includes crop which may be laid, leaning, or twisted, as well as upright crop.

A first main aspect of the invention is concerned with crop stripping elements which may be provided.

In accordance with one preferred feature at least some of the crop engaging elements comprise crop stripping elements each of which has at least one inclined edge for detaching required crop parts from standing crop, and a transverse surface for impelling the detached crop parts along the crop flow passage.

Preferably the said inclined edge is inclined to a normal to the moveable support means at an angle greater than $7\frac{1}{2}°$, more preferably at an angle greater than $10°$ and most preferably at an angle in the range $12\frac{1}{2}°$ to $22\frac{1}{2}°$. Conveniently the angle is about $15°$.

In accordance with another preferred feature at least some of the coop engaging elements comprise crop stripping elements each of which has a narrow tip for entering into and dividing crop, and has side edges for detaching the required crop parts, the said side edges diverging from each other in a direction away from the distal tip of the element.

Preferably the said side edges diverge from each other over at least a quarter of the crop engaging length of the element, more preferably over at least a third of the crop engaging length of the element, and most preferably over a major proportion of the crop engaging length of the element.

Preferably the said side edges diverge from each other away from the distal tip of the element at a total included angle greater than $15°$. Conveniently the angle lies in the range $20°$ to $70°$, more preferably in the range $25°$ to $60°$, and most preferably in the range $25°$ to $45°$. Conveniently the angle is about $30°$.

Preferably the diverging side edges diverge substantially on either side of a normal to the moveable support means.

It is preferred that each crop stripping element has a transverse, substantially planar surface between the said diverging side edges, for impelling the detached crop parts along the crop flow passage.

The elements may be of varying shapes which will be set out hereinafter, but it is preferred particularly that the distal tip region of each crop stripping element is pointed with the distal side edges diverging from the apex of the element, preferably the distal tip region having a transverse, substantially planar leading surface.

In accordance with one preferred feature of the invention in the aspects set out above there are provided on side edges of the crop stripping elements, and/or at the junction of adjacent crop stripping elements, relief spaces for detaching crop parts by the effect of edges of the spaces and for allowing stripped remaining crop parts to be released from the elements.

For example the crop stripping elements may be formed by the teeth of a series of transverse combs mounted on the support means transverse to the direction of movement of the support means, there being provided at the junction of adjacent side edges of adjacent teeth on a comb an aperture allowing stripped stems to be released from the comb, the said aperture having side edges adapted to strip the required parts from the crop stems.

As a general feature, in some forms the crop engaging elements may be arranged on the moveable support means in rows transverse to the general direction of crop movement of the apparatus, and the spacing between distal tips of adjacent elements along a row may be made substantially greater than the narrowest distance between the two adjacent elements. For example the spacing between distal tips of adjacent elements along a row may be greater than three times the minimum distance between the two adjacent elements.

It is preferred that each element is a transverse element having an overall width transverse to the direction of movement of the element which is greater than its depth along the direction of movement. Preferably each element is a substantially planar element having a principal plane transverse to the direction of movement of the element by the support means. In many preferred forms, each element has a portion at or in the region of its base which is narrower than the widest part of the crop engaging portion of the element.

A number of preferred and optional features have been set out, in accordance with a first aspect of the invention. In accordance with one particularly preferred combination of such features, there may be provided apparatus for harvesting crop comprising: a mobile frame for movement over the ground; moveable support means mounted for driven movement relative to the frame; a plurality of outwardly projecting crop engaging elements mounted on the moveable support means; guide means co-operating with the crop engaging elements to form a crop flow passage; and drive means for driving the moveable support means to carry the elements upwardly and rearwardly at a front region of the apparatus so as to detach from standing crop predetermined required parts of the crop and to move the detached crop parts along the crop flow passage; in which at least some of the crop engaging elements comprise crop stripping elements each of which has a narrow tip for entering into and dividing crop and has side edges which diverge from each other in a direction away from the distal tip of the element over at least a substantial portion of the crop engaging length of the element for detaching crop parts from standing crop, the leading crop engaging surface of each crop stripping element between its diverging edges being a transverse, substantially planar, surface for impelling detached crop parts along the crop flow passage; the crop stripping elements being mounted in a position such as to engage crop unsupported by other components of the apparatus, and being driven in movement in such a manner that detached crop parts do not reside to any substantial extent on the moving crop stripping elements; the crop flow passage having at its intake region a horizontal clearance from the distal tips of the crop stripping elements of at least the effective pitch of the crop stripping elements. The features set out in this combination may be present separately in some forms of the invention.

A preferred range for the horizontal clearance at the intake region of the crop flow passage is that the clearance is at least equal to the effective pitch of the crop stripping elements and is no greater than half the diameter of the peripheral path of the element tips where the elements are moved on a rotor or around a pulley set or like guide of a conveyor, the clearance being sufficient to allow detached crop parts to enter the crop flow passage but not so great as to allow loss of detached crop parts.

By a transverse, substantially planar surface is meant a surface which lies substantially in a plane which extends principally transverse to the direction of movement of the element The plane of the surface may conveniently be substantially flat, but in some arrangements may be curved, preferably slightly concave.

By the effective pitch of the crop stripping elements is meant the pitch of elements which are transversely adjacent to each other as the elements are presented to the crop by movement of the moveable support means, whether the adjacent elements are presented in single rows transverse to the movement, or whether effectively adjacent elements are positioned as offset elements in succeeding rows presented to the crop.

In accordance with a second main aspect of the present invention, there is provided apparatus for harvesting crop comprising: a mobile frame for movement over the ground; moveable support means mounted for driven movement relative to the frame; a plurality of outwardly projecting crop engaging elements mounted on the moveable support means; guide means co-operating with the crop engaging elements to form a crop flow passage; and drive means for driving the moveable support means to carry the elements upwardly and rearwardly at a front region of the apparatus so as to detach from standing crop predetermined required parts of the crop, and to move the detached crop parts along the crop flow passage; in which at least some of the crop engaging elements comprise crop stripping elements having relief spaces on side edges of the elements, and/or at the junction of adjacent elements.

In one preferred form of such an arrangement, the relief spaces are arranged for allowing stripped stems or other remaining crop parts to be released from the elements, and/or for providing edges of the elements adapted to strip required parts of the crop.

In accordance with a preferred feature it may be provided that at least some of the relief spaces are defined by re-entrant edges of the elements adapted to strip crop parts from regions of the standing crop which face forwardly relative to the intended direction of movement of the apparatus.

In accordance with another preferred feature it may be provided that the crop stripping elements are mounted in rows transverse to the direction of movement of the moveable support means, succeeding rows of crop stripping elements being slanted in opposite directions so that co-operation between succeeding rows of oppositely slanted elements forms funnel-shaped intake regions, followed inwardly by relief spaces.

In some arrangements it may be provided generally in accordance with the invention that crop stripping elements are mounted in rows transverse to the direction of movement of the moveable support means, elements in succeeding rows being substantially aligned with each other along the direction of movement of the moveable support means, crop being gathered between elements which are adjacent to each other along a row.

In other arrangements it may be provided generally in accordance with the invention that the crop stripping elements are mounted in rows transverse to the direction of movement of the moveable support means, elements in succeeding rows being offset from each other transverse to the direction of movement of the moveable support means, the elements in each row being spaced apart in such a manner that crop is gathered between elements which are effectively adjacent to one another in presentation to the crop, but are positioned in succeeding rows.

In accordance with a third main aspect of the present invention, there is provided apparatus for harvesting crop comprising: a mobile frame for movement over the ground; moveable support means mounted for driven movement relative to the frame; a plurality of outwardly projecting crop engaging elements mounted on the moveable support means; guide means co-operating with the crop engaging elements to form a crop flow passage; and drive means for driving the moveable support means to carry the elements upwardly and rearwardly at a front region of the apparatus so as to detach from standing crop predetermined required parts of the crop and to move the detached crop parts along the crop flow passage; in which the outwardly protecting crop engaging elements vary in shape and/or size and/or inclination.

In one example, the crop engaging elements comprise crop stripping elements arranged on the mobile support means in rows transverse to the direction of movement of the moveable support means, the profile of each row being shaped to provide portions projecting outwardly to greater and lesser extents.

In some examples, the lengths of the element may be varied to provide serrations in the overall profile of the elements transverse to the direction of movement of the moveable support means for the purpose of stripping crop by the effect of the sides of the serrations. In such an arrangement the crop engaging elements may be filaments, e.g. bristles, of a brush. Thus a brush rotor may be used for crop stripping, such a brush having transverse rows of brush filaments, profiled by varying the length of the filaments to form in effect serrated combs.

In other examples, some of the outwardly extending crop engaging elements extend outwardly from the moveable support means to a greater extent than others, the longer elements being arrange for disentangling, lifting and/or orientating crop and shorter elements for effecting crop stripping.

In yet another example, the crop engaging elements may include crop stripping elements mounted on the support means in rows transverse to the direction of movement of the support means, there being provided along the moveable support means between succeeding rows, or groups of rows, of crop stripping elements, outstanding transverse substantially plain ribs acting to limit the depth of intrusion of the crop between stripping elements, and/or acting to collect and convey crop parts stripped by the outwardly projecting crop engaging elements. This arrangement is particularly applicable where the crop stripping elements comprise filaments forming brushes, or comprise outwardly directed rods.

In a yet further example, the elements may comprise stripping elements mounted in rows transverse to the direction of movement of the moveable support means, the elements consisting of elongate fingers slanted to one side, succeeding rows of elements being slanted optionally in opposite directions so that co-operation between succeeding rows of oppositely slanted elements effects crop stripping, preferably the co-operation between succeeding rows forming funnel-shaped intake regions, followed inwardly by relief spaces.

In accordance with another feature of this aspect of the present invention, it may be provided that the elements comprise crop stripping elements mounted in rows transverse to the direction of movement of the moveable support means, the elements being moveable relative to each other transversely and being secureable in selected positions so as to vary the profile of the elements presented to crop for stripping different forms of crop.

Those features and aspects of the present invention which have been set out above are concerned mainly with the shape and operation of crop stripping elements, and there will now be set out a number of advantages and features in this connection.

Although it is preferred that the crop engaging elements for stripping the crop are generally planar elements having a principal plane transverse to the direction of movement of the elements, such planar elements may be variously shaped along the crop engaging edges for example by being scalloped, notched or otherwise recessed, to increase the rubbing effect. Crop stripping elements may consist of arrays of generally triangular teeth, each tooth being bent longitudinally or rolled transversely or having its edges rolled or bent forwards on the crop engaging surface, in order to scoop detached seed or crop particles, to minimise losses.

It is particularly preferred that the crop stripping elements are formed by teeth of a comb comprising a planar transverse rib of solid material shaped to provide the teeth. Conveniently the crop stripping elements are formed of synthetic plastics material, but they maybe made of metal or other materials of adequate strength and wear resistance.

The elements may comprise arrays of pointed, generally triangular teeth at the root of which are formed elongate straight or slanted recesses, to increase the duration and extent of the work done by the elements on the crop. There may also be provided circular, square, trapezoidal or other shapes of relief apertures wider than the narrowest part of each recess between pairs of teeth, to enable seed heads, stems, tillers or branches to received all-round treatment, and after being stripped, to withdraw from the stripping space without interfering with incoming crop. In general it is preferred that transverse arrays of crop stripping elements are arranged along the crop conveying means so that tips of successive rows follow the same path, but this is not essential and elements may be variously staggered from row to row in some arrangements, for example being displaced laterally by half the tooth pitch.

As has been mentioned the crop engaging elements may comprise a succession of transverse rows of outwardly projecting crop stripping elements and a succession of transverse, substantially plain ribs, the ribs and rows of elements being alternated, with the ribs following relatively closely behind the rows of stripping elements. The ribs collect and impel the required parts of the crop detached by the immediately preceding row of crop stripping elements, and limit the ingress of crop being created into the stripping space.

The use of a plain rib behind a row of crop stripping elements has application for a number of different kinds of crop engaging elements, but has particular application where the crop engaging elements consist of outwardly directed brush tufts, brush filaments, or rods, whether circular or of rectangular or curved cross section. In such cases, the rows of crop engaging elements act to dislodge the required portions of the crop, and these are caught and conveyed by the following plain rib. Conveniently the spacing of the rows of elements and the ribs may be such that there is a lesser space between each row of crop engaging elements and the following plain rib, than there is between that plain rib and the next following transverse row of crop engaging elements.

Considering the invention in general, it is to be appreciated that the actual process of stripping will involve contact of different parts of the stripping elements with the crop at different times as the apparatus moves forwardly into the crop during the upward movement of the elements. Preferably the elements are shaped so that a progressive stripping action takes place as the machine moves forwardly and elements intrude to a greater extent into the crop.

The provision of a relief space or aperture at the junction of each pair of adjacent stripping elements may be made for detaching the required parts of the crop by engagement of the crop with the edges of an aperture at the junction of each pair of adjacent elements, and for the different, or additional, purpose of assisting release of crop from the elements after stripping. It is one particular preferred feature of the invention that such a relief space or aperture can be defined by a re-entrant edge and can assist in stripping required parts of the crop from the forward facing part of the stems which may not normally be engaged by the side edges of the elements.

Conveniently the said moveable support means comprises either a rotor or a conveyor belt or similar endless elongate conveying means for moving the crop engaging elements along a path including the required portion moving upwardly and rearwardly at the front region of the apparatus.

Where the crop engaging elements are arranged in transverse arrays, each transverse array of elements will normally be arranged at right angles to the direction of forward travel of the apparatus, for example the arrays of outwardly projecting elements may lie in radial planes of a rotor passing through the axis of rotation of the rotor. However in other arrangements the transverse array of crop engaging elements may lie across the direction of forward travel of the apparatus, but at an angle thereto, and the arrays may of course be rectilinear or curved For example transverse arrays of elements may be formed as helical formations formed around and along the axis of a rotor. Such helical arrays may provide a more aggressive crop stripping action.

Although the various features set out may be combined in different arrangements, there are two main convenient forms. In one main form there are provided brushes, filaments, rods or the like which dislodge the required portions of crop such as seeds, and are followed by plain ribs or paddles which collect and transport the dislodged material. In the other form, the material is dislodged by a succession of transverse combs each bearing tapered teeth which both remove the required portions of the crop, and also effect at least part of the catching and conveying of the dislodged material.

Where brushes are provided, they may be in the form of transverse rows of spaced apart brush tufts, or may be in the form of continuous transverse banks of brush elements.

Conveniently crop stripping elements may be arranged in groups joined integrally together, and may be provided with means for easily detaching the groups for example by snapping the elements onto fasteners left in situ on the moveable crop support means.

As has been mentioned, arrays of crop stripping elements may be provided in which there are at intervals longer, protruding elements, to disentangle, loosen, lift and/or orientate crop which would otherwise be unfavourably presented. In some arrangements, such longer elements may be mounted between adjacent rows of stripping elements at intervals along the moveable crop support means, so that they protrude and engage unfavourably presented crop in advance of closely spaced arrays of stripping elements, the longer elements optionally being held in their normal operating position by resilient biassing means, to protect them against ground contact or atypical loads. Optionally, the longer elements between adjacent rows of stripping elements may be mounted on a common transverse member so secured that the elements may be pivotted and locked in alternative angular positions, or may be fully reclined.

When the stripping elements in successive arrays are aligned along the direction of movement of the support means, this is particularly suitable for detaching, for example, seeds from the ends of stems, and for defoliating plants. Relief recesses (where provided) between laterally adjacent elements should, in such cases, preferably be symmetrical. If alternate arrays of elements are laterally offset by half the element pitch, then a lateral shaking action is imparted to the crop, and this will result in more plant material becoming detached. If relief recesses are slanted to one side at the bases thereof, this results in an even more severe action, and may be used to break off the ends of plants or branches of shrubs and the like.

According to the invention in a fourth main aspect there is provided apparatus for harvesting crop comprising: a mobile frame for movement over the ground; moveable support means mounted for driven movement relative to the frame; a plurality of outwardly projecting crop engaging elements mounted on the moveable support means; guide means co-operating with the crop engaging elements to form a crop flow passage; and drive means for driving the moveable support means to carry the elements upwardly and rearwardly at a front region of the apparatus so as to detach from standing crop predetermined required parts of the crop and to move the detached crop parts along the crop flow passage; in which the said moveable support means comprises an endless conveyor having an upper run reclined relative to the vertical, the crop engaging elements projecting outwardly from the conveyor.

Preferably the conveyor as a support surface between the crop engaging elements for catching crop parts detached by the crop engaging elements.

Preferably the said upper run of the conveyor includes at least one change of inclination relative to the vertical.

Conveniently the said endless conveyor is entrained about more than two sets of pulleys or like guides, at least one pulley set being included in the said upper run between the beginning and end of tee upper run, so as to provide the said change of inclination to the vertical.

In preferred forms of this aspect of the invention, it is an advantage that the portion of the conveyor belt in contact with the crop is reclined relative to the direction of travel, so that free crop parts which tend to fall down are recovered by the support surface. As an important feature the tip speed of the stripping elements varies during movement of the conveyor around three sets of pulleys or like guides, to give high-speed intrusion into standing crop or stripping of low seeds and foliage; followed by a reduced-speed combing action; followed by higher-speed stripping of upper seed or foliage; followed by a reduced-speed conveying action; followed by a high-speed impelling of stripped material at the end of the conveyor upper run. The use of the conveyor system allows shall diameter tip paths around the pulleys to be used without running the risk of wrapping, as may occur if a stripping rotor has too small a diameter in relation to the length and condition of the crop.

There will now be set out a fifth main aspect of the invention, which may be regarded as an alternative to the immediately preceding aspect of the invention. In accordance with this further main aspect of the invention there is provided apparatus for harvesting crop comprising: a mobile frame for movement over the ground; moveable support means mounted for driven movement relative to the frame; a plurality of outwardly projecting crop engaging elements mounted on the moveable support means; guide means co-operating with the crop engaging elements to form a crop flow passage; and drive means for driving the moveable support means to carry the elements upwardly and rearwardly at a front region of the apparatus so as to detach from standing crop predetermined required parts of the crop, and to move the detached crop parts along the crop flow passage; in which the moveable support means comprises a first rotor and there is provided a second rotor positioned with its axis of rotation at a higher level than the axis of rotation of the first rotor, the drive means being arranged to drive the rotors in rotation about substantially horizontal axes and in the same sense of rotation, the upper rotor being positioned so as to collect crop from the lower rotor and to carry the detached crop parts upwardly and rearwardly over the upper rotor.

Preferably it is arranged that the upper rotor is positioned so that no part of the upper rotor protrudes forward of a vertical plane passing through the front-dead-centre of the lower rotor. It is also preferred that the outer peripheries of the two rotors overlap, crop engaging elements on one rotor intermeshing with crop engaging elements on the other rotor without contact between the two. This aspect of the invention has particular application where the lower rotor is of smaller diameter than the upper rotor, the lower rotor having crop engaging elements adapted to mainly for detaching crop parts, and the upper rotor being provided with crop engaging elements adapted at least mainly for conveying crop.

In this aspect of the invention it is possible to obtain the advantage of a relatively small diameter, lower, stripping rotor, which presents the elements well to the crop, and to prevent wrapping by the effect of the second, higher rotor. The lower rotor may be of small diameter to impel stripped crop particles into favourable, upwardly directed trajectories for positive recovery.

In accordance with a sixth main aspect of the present invention there is provided apparatus for harvesting crop comprising: a mobile frame for movement over the ground; moveable support means mounted for driven movement relative to the frame; a plurality of outwardly projecting crop engaging elements mounted on the moveable support means; guide means co-operating with the crop engaging elements to form a crop flow passage; and drive means for driving the moveable support means to carry the elements upwardly and rearwardly at a front region of the apparatus so as to detach from the stems of standing crop predetermined required parts of the crop; in which there are provided crop control means for holding down and/or urging rearwardly the lower parts of the crop being stripped, so as to reduce the risk of uprooting of crop during stripping, e.g. in soft ground conditions.

The said crop control means may comprise a horizontal roller positioned under the moveable crop support means, and rotated in such a direction that the lower part of the roller moves in the opposite direction to the direction of movement of the crop engaging elements.

Alternatively or in addition the said crop control means may comprise a member at the rear of the elements extending under the elements sufficiently to contact the lower parts of standing crop being stripped by the said crop engaging elements.

In some arrangements, there may be provided a close-fitting adjustable plate at the lower rear of the moveable crop support means, when this comprises a rotor, to minimise the risk of ground contact, to counteract the tensile forces applied to plant stems by the stripping elements, and to re-introduce plant parts (which have not left the rotor envelope in time to be collected) into the crop in front of the rotor for subsequent recovery.

Conveniently there may be provided in the lower quarter of a crop stripping rotor according to the invention (i.e. behind, to slightly in front of, bottom-dead-centre), a freely rotating rotor, or counter driven plain, fluted, ribbed, corrugated or otherwise suitable profile roller, to counteract the tensile forces applied to the crop by the stripping elements.

In another arrangement there may be provided under the lower rear quarter of a crop stripping rotor embodying the invention, forwardly projecting roller on height-adjustable and optionally spring-loaded arms, to prevent ground contact by the rotor, to help counteract the tensile forces applied to the crop by the stripping elements, and/or to press down the crop residue.

The means for reducing uprooting of crop may comprise a downturned lip at the front of a concave plate under the support means on which the elements are mounted, or may comprise a further rotor or roller which conveniently is driven in counter-rotation to the direction of movement upwardly and rearwardly of the crop engaging elements, or which is an idling roller. Such a roller may also act as a height limiting roller to prevent damage to the crop engaging elements by striking the ground.

In accordance with a seventh main aspect of the invention there is provided apparatus for harvesting crop comprising: a mobile frame for movement over the ground; moveable support means mounted for driven movement relative to the frame; a plurality of outwardly projecting crop engaging elements mounted on the moveable support means; guide means co-operating with the crop engaging elements to form a crop flow passage; and drive means for driving the moveable support means to carry the elements upwardly and rearwardly at a front region of the apparatus so as to detach from standing crop predetermined required parts of the crop and to move the detached crop parts along the crop flow passage; in which there is provided a crop flow modifying device for forcing detached crop parts into contact with the said crop engaging elements, the crop flow modifying means being stationary relative to the frame in normal operation and having projections which project into the crop towards the crop engaging elements of the moveable crop support means in a region through which detached crop parts are conveyed by the crop engaging elements, the projections of the crop flow modifying device extending sufficiently to overlap the outer periphery of the moving elements and to intermesh with the moving elements without contact with the moving elements.

In one preferred form the crop flow modifying means comprises a transverse planar member having a principal plane transverse to the crop flow and having serrations which provide the said projections.

In another preferred form, the said projections on the crop flow modifying device are planar fins having the principal planes thereof lying substantially along the direction of crop flow.

In accordance with an eighth main aspect of the invention, there is provided apparatus for harvesting crop comprising: a mobile frame for movement over the ground; moveable support means mounted for driven movement relative to the frame; a plurality of outwardly projecting crop engaging elements mounted on the moveable support means; guide means co-operating with the crop engaging elements to form a crop flow passage; and drive means for driving the moveable support means to carry the elements upwardly and rearwardly at a front region of the apparatus so as to detach from standing crop predetermined required parts of the crop, and to move the detached crop parts along the crop flow passage in which the guide means comprises a cover extending around at least part of the region at which the crop engaging elements move upwardly and rearwardly, and one or more driven or freely rotating rollers at the intake region of the crop flow passage.

In a preferred form, there may be included an adjustable housing extending around at least part of the roller or rollers for adjusting the amount of interaction of the roller or rollers with standing crop.

Thus there may be provided under the edge of a hood or cover over a crop stripping rotor embodying the invention, a freely rotating rotor, or undershot driven roller, optionally ribbed, fluted, dimpled, or otherwise profiled or provided with small curved or straight tines or teeth, to counteract in undriven form the tensile forces applied by the stripping rotor to crop lying or leaning towards the rotor. When driven, such a roller acts to loosen or lift unfavourably presented crop before it makes contact with the rotor in addition to directing into the crop flow passage particles which are thrown towards it by the stripping combs. Instead of the single roller or rotor at this position, there may be provided below the leading edge of the front rotor cover a primary and a secondary crop control rotor to serve the purposes given above, the secondary rotor providing a stripping function for the primary rotor.

In accordance with a ninth main aspect of the present invention, there is provided apparatus for harvesting crop comprising: a mobile frame for movement over the ground; moveable support means mounted for driven movement relative to the frame; a plurality of outwardly projecting crop engaging elements mounted on the moveable support means; guide means co-operating with the crop engaging elements to form a crop flow passage; and drive means for driving the moveable support means to carry the elements upwardly and rearwardly at a front region of the apparatus so as to detach from standing crop predetermined required parts of the crop and to move the detached crop parts along the crop flow passage; in which there are provided means for producing a forced air flow for positioning crop before stripping and/or for directing the stream of detached crop parts and/or separating the detached crop parts into selected different fractions.

The forced air flow means may comprise a plenum or manifold supplied with pressurised air and being formed on the front of a hood or cover extending around at least part of the region in which the elements are moved upwardly and rearwardly by the moveable support means; and/or a plenum or manifold supplied with pressurised air and being formed with an adjustable outlet allowing the forced air flow to be directed in a variable selected direction; and/or a plenum or manifold supplied with pressurised air and being formed inside a rotary or otherwise moving component of the apparatus with means for directing a forced air flow in a selected direction outwardly from the inside of the moving component.

The forced air stream may be used to assist in feeding the crop into a crop stripping rotor and/or to convey the stripped material through a crop flow passage. The air stream may be directed selectively to perform different purposes, for example to enable crop leaning or laid away from the machine to be lifted, or crop particles detached by the apparatus to be assisted along a crop passage.

In accordance with a tenth main aspect of the present invention, there may be provided apparatus for harvesting crop comprising: a mobile frame for movement over the ground; moveable support means mounted for driven movement relative to the frame; a plurality of outwardly projecting crop engaging elements mounted on the moveable support means; guide means co-operating with the crop engaging elements to form a crop flow passage; and drive means for driving the moveable support mean to carry the elements upwardly an rearwardly at a front region of the apparatus so as to detach from standing crop predetermined required parts of the crop and to move the detached crop parts along the crop flow passage; in which there are provided means for separating the detached parts of the crop into selected, different fractions.

The separating means may comprise a separating screen against which the crop is propelled, the screen having spaces through which smaller parts of the crop pass, larger parts of the detached crop being deflected by the screen, and/or by means of a rotary device against which the detached crop is propelled in such a manner that different fractions of the detached crop are directed differently by the rotary device.

The separating means may be arranged so that the detached parts of the crop are propelled against the screen or rotary device by the moving crop engaging elements on the moveable support means.

It may be arranged that the said screen directs the larger fraction of the detached crop parts to means for rubbing, rethreshing or comminuting the crop parts.

It may also be arranged that the rotary device comprises a forwardly rotating transverse auger, the detached crop being directed towards the top-dead-centre position of the auger so that different fractions of the detached crop ar directed differently by the auger. In this way the short heavy fraction of stripped material may be directed rearwardly behind the auger and the bulky fraction forwardly and downwardly under the auger.

In accordance with an eleventh main aspect of the present invention there is provided apparatus for harvesting crop comprising: a mobile frame for movement over the ground; moveable support means mounted for driven movement relative to the frame; a plurality of outwardly projecting crop engaging elements mounted on the moveable support means; guide means co-operating with the crop engaging elements to form a crop flow passage; and drive means for driving the moveable support means to carry the elements upwardly and rearwardly at a front region of the apparatus so as to detach from standing crop predetermined required parts of the crop and to move the detached crop parts along the crop flow passage; in which there are provided means for preventing or inhibiting escape of the detached parts of the crop from the apparatus.

In preferred arrangements, the means for preventing or inhibiting escape of detached parts of the crop may comprise a hanging check curtain of flexible material against which detached crop parts are thrown at the front or rear of the apparatus by the moving crop engaging elements on the moveable support means; and/or one or more baffles or deflectors to prevent or reduce loss of detached crop parts due to ricochetting off a cover extending around the moving elements and/or due to bouncing out of a crop conveying means at the rear of the moveable support means; and/or at least one pronounced reverse step at the lower front region of a cover extending around at least part of the region in which the elements are moved upwardly and rearwardly by the moveable support means; and/or resilient lining of surfaces against which detached crop parts are thrown.

In a preferred arrangement there are provide a series of reverse steps in a lower, front section of a cover or hood over a rotor, to re-direct descending crop particles back towards the stripping mechanism.

In another preferred arrangement there may be provided an angularly and/or height adjustable hollow front section attached to the lower end of a rotor cover, of minimal weight or counter-balanced to rest and float on the crop canopy, to prevent forward splash or crop particles and re-direct particles towards the stripping rotor. Such a protruding front section gives useful guidance on header height setting to the operator of self-propelled harvesters.

In accordance with a twelfth main aspect of the present invention there is provided apparatus for harvesting crop comprising: a mobile frame for movement over the ground; moveable support means mounted for driven movement relative to the frame; a plurality of outwardly projecting crop engaging elements mounted on the moveable support means; guide means co-operating with the crop engaging elements to form a crop flow passage; and drive means for driving the moveable support means to carry the elements upwardly and rearwardly at a front region of the apparatus so as to detach from standing crop predetermined required parts of the crop, and to move the detached crop parts along the crop flow passage; in which at least some of the crop engaging elements comprise planar crop stripping elements having principal planes transverse to the direction of movement of the elements, the elements being resiliently mounted, and/or made of flexible resilient material, to prevent or inhibit damage by impact with the ground or foreign objects.

In some arrangements it may be provided that the said elements are formed by the teeth of succession of transverse combs mounted on the support means and each having an array of outwardly projecting teeth mounted in a row transverse to the direction of movement of the frame through the crop, each comb being formed of stiff material, and being resiliently mounted to allow yielding of the comb by tipping or rocking movement rearwardly, there being provided resilient biassing means urging the comb towards its normal operating position. Alternatively, each comb may be formed of material which is sufficiently stiff to perform effectively the stripping function but has adequate resilience to bend and restore in response to resilient atypical loads. Such resilience is preferable where the planar comb is forwardly inclined relative to the movement of the elements, since deflection by a resilient comb need not increase the outward extension of the elements, e.g. need not increase the diameter of a rotor. Forwardly inclined coop stripping elements are in general often a preferred feature since these give a scooping action to detached crop parts.

There will now be set out a series of preferred and optional features of the invention which may be used in combination with the preceding features, or which may form independent features.

It is a particularly preferred general feature that the crop engaging elements may be mounted in a position such as to engage crop unsupported by other components of the apparatus. In preferred embodiments, it may be arranged that the only components of the apparatus to enter into the crop and to divide and gather the crop in the region at which the said crop parts are stripped from the crop, are driven moving elements which are mounted on the said moveable support means.

It may also be arranged as a preferred general feature that at least some of the crop engaging elements comprise crop stripping elements each of which has at least one inclined edge for detaching required crop parts from standing crop, and a transverse surface for impelling the detached crop parts along the crop flow passage.

It may also be arranged as a preferred general feature that at least some of the crop engaging elements comprise crop stripping elements each of which has a narrow tip for entering into and dividing crop, and has side edges for detaching the required crop parts, the said side edges diverging from each other in a direction away from the distal tip of the element.

It may also be arranged as a preferred general feature that the distal ends of the crop engaging elements are pointed at the tips so as to minimise disturbance of the crop.

It may also be arranged as a preferred general feature that there are provided on side edges of the crop stripping elements, and/or at the junction of adjacent crop stripping elements, relief spaces for detaching crop parts by the effect of edges of the spaces and for allowing stripped remaining crop parts to be released from the elements.

It may also be arranged as a preferred general feature that the crop engaging elements are driven in movement in such a manner that detached crop parts do not reside to any substantial extent on the moving crop stripping elements. In particular it is preferred that the drive means is arranged to drive the elements at a speed sufficiently high to impel the detached crop parts along the crop flow passage and to release crop parts at the rear at least predominantly by centrifugal effect.

It may also be arranged as a preferred general feature that the crop flow passage has at its intake region a horizontal clearance from the distal tips of the crop stripping elements of at least the effective pitch of the crop stripping elements.

It is a generally preferred feature in all arrangements of the invention that each element may be an element having an overall width transverse to the direction of movement of the element which is greater than its thickness.

It may also be arranged as a preferred general feature that the leading crop engaging surface of each crop engaging element is a transverse, substantially planar, surface for impelling detached crop parts along the crop flow passage. It is also preferred that each element is a substantially planar element having a principal plane transverse to the direction of movement of the element by the support means.

In general, those aspects of the invention which have been described with reference to apparatus according to the invention, may also be provided with reference to methods of harvesting in accordance with the invention, and vice-versa.

In particular there may be provided in accordance with the present invention a method of harvesting crop comprising moving through a standing crop a harvesting apparatus, moving upwardly and rearwardly at a front region of the apparatus a plurality of outwardly projecting crop engaging elements, engaging the standing crop by the moving elements, detaching from standing crop predetermined required parts of the crop, conveying the detached crop parts along a crop flow passage and collecting the detached crop parts.

In one preferred form of the method of the invention, the method includes the steps of entering into the crop narrow tips of the crop engaging elements to divide the crop, gathering crop between pairs of elements, detaching the said crop parts at least to a significant extent by the action of side edges of each element which diverge from each other in a direction away from the distal tip of the element, and impelling crop along the crop flow passage by transverse substantially planar surfaces of the elements.

In another preferred form of the method of the invention, the method includes entering the elements into the standing crop, and detaching the said crop parts at least to a significant extent by the effect of edges of relief spaces which are provided on side edges of the elements and/or at the junction of adjacent elements, and allowing stripped remaining crop parts to be released from the elements through such relief spaces.

In another preferred form of the method of the invention, the method includes entering into the standing crop outwardly projecting crop engaging elements which vary in shape and/or size and/or inclination, and which carry out different functions on the crop.

In accordance with one preferred feature of the method of the invention, the method includes the step of reducing the risk of uprooting of crop during stripping by holding down and/or urging rearwardly the lower parts of the crop being stripped.

It is a feature of tee present invention in one aspect that the crop engaging elements are moved at a relatively high speed A number of criteria can be used to establish the required high speed, for example the speed of movement of the crop engaging elements relative to the frame may be set to be greater than the forward speed of movement of the frame; and/or may be set to be such as o release crop from the elements towards a collection region of the apparatus at least predominantly by centrifugal effect; and/or may be set at a speed such as to propel the stripped material in a fast moving stream upwardly and rearwardly along the crop flow passage defined between the guide means and the upwardly and rearwardly moving crop engaging elements. In preferred arrangements, the speed of movement of the outer tips of the elements relative to the frame will be substantially greater than the forward speed of movement of the harvesting apparatus, for example greater than twice the forward speed of movement of the harvesting apparatus. Preferably the tip speed of the crop engaging elements is greater than 5 m/s, most preferably greater than 10 m/s. The forward speed of the frame may be in a range up to 10 km/hour, preferably in the range 3 to 9 km/hour.

In examples of preferred methods embodying the invention, a method of harvesting cereals may include moving the crop engaging elements relative to the frame at a speed such that the tip speed of the elements is in the range 10 to 25 m/s. In accordance with another preferred example, a method of harvesting lucerne (alfalfa) includes moving the crop engaging elements relative to the frame at a speed such that the tip speed of the elements is in the range 15 to 30 m/s.

It is a general preferred feature of the present invention that the crop engaging elements may enter the crop with minimum disturbance, and move upwardly through the crop to strip the required parts of the crop without the need for the crop to be supported in an upright position by any stationary guide members projecting forwardly of the said moving crop engaging elements. It is to be appreciated that there may be provided in some arrangements additional stationary lifting elements for raising the crop to the moving crop engaging elements in suitable manner where the crop is laid, but there is, at least in preferred embodiments of the invention, no requirement for stationary guide elements to hold the crop in the upright position during stripping in the vertical crop region swept by the crop stripping elements.

As has been mentioned, the guide means will normally consist of or include a hood or cover over the upwardly and rearwardly moving elements. It is preferred that the said hood may be moveable either closer to or further from the crop engaging elements, and/or around a curved path around the front of the path of movement of the elements. Where the elements are provided on a rotor, there may be provided a concave plate under the rotor, and this may also be adjustable, for example about a circular path centred on the axis of the rotor.

Particular advantage is obtained if there are provided means for adjusting the overhead hood, and an adjustable concave beneath a stripping rotor, since together these adjustments limit the intrusion of crop into the rotor space, and give control of the degree of stripping and the manner of stripping the crop.

In accordance with another feature of the invention, there may be provided means for adjusting the height of support means for the crop engaging elements, either together with the height of the overhead hood, or independently of the height of the overhead hood, to allow adjustment of the height at which the crop engaging elements enter the crop and move upwardly through the crop.

The present invention has a number of applications, particularly in the harvesting of grain. The stripped material can be collected into trailers or bulk containers for transportation to a central plant for processing. In the case of cereals and other seeds this may include completion of the threshing process and separation of the seed from material other than grain. Alternatively, particularly with cereals and other seeds, the stripped material may be fed directly into a processing machine, such as a combine harvester, for immediate threshing and cleaning. At a central plant or in the field the material other than grain may be collected loose or pressed for utilisation.

Generally, the invention finds application in the harvesting of mature seeds and grains, in the vining of peas and in the defoliation of annual and perennial crops as well as shrubs, including the non-destructive harvesting of leaves and shoots in one or repeated passes over the crop.

The present invention provides a number of advantages as a result of only the seed-bearing parts of cereal, pulse, herbage and other crop being collected for passage through a harvester, such as a combine harvester. Because less unwanted material is taken in, the work rate and output of the harvester can be greatly increased, sometimes by a factor of two or more. The straw left standing will dry quickly after rain and can be burnt easily and completely (if it is to be disposed of in this way), with the ash becoming uniformly distributed. If the straw is to be chopped for incorporation into the soil, comminution mechanisms can be more effective with standing straw than in windrowed straw because the stems are still attached to the ground. Even distribution of the chopped material is more easily achieved. If the straw is to be harvested, it can be readily cut by a windrower, for example attached to a tractor which pulls and powers the harvesting machine. If desired the straw may be cut immediately by a mowing mechanism of known design mounted behind the stripping header.

Embodiments of the invention will now be described by way of example with reference to the accompanying drawings in which:

FIG. 1(a) is a diagrammatic side view in section of one general form of apparatus for harvesting crop, embodying the present invention;

FIG. 2 is a diagrammatic side view in section of one form of apparatus embodying the invention, particularly for stripping grain from a standing crop;

FIG. 6(a) is a diagrammatic side view in section of a modification of the apparatus in FIG. 1, embodying the invention, showing a crop feeding and support roller beneath the front edge of the rotor cover or hood of the apparatus;

FIG. 6(b) is a diagrammatic side view in section of part of the rear of the apparatus of FIG. 6(a), showing the replacement of the rear auger arrangement by check panels;

FIG. 6(c) shows a view in the direction of the arrows C—C in FIG. 6(a);

Figures 7A, 7B:
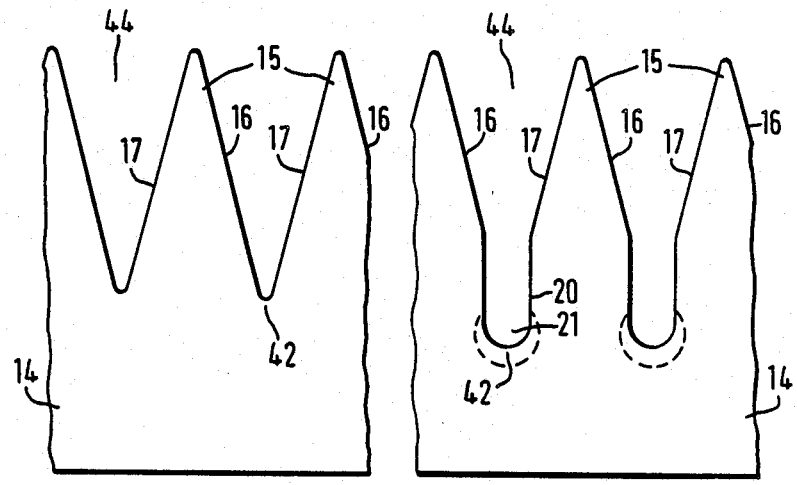
Figures 7C, 7D:
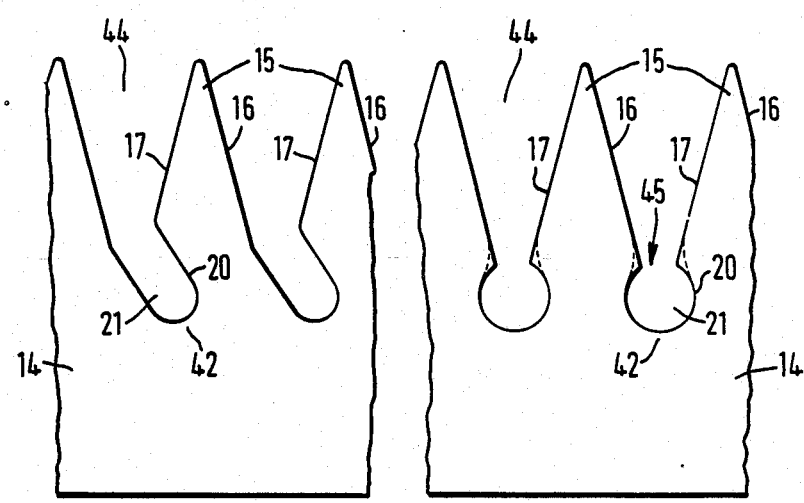
Figure 9:
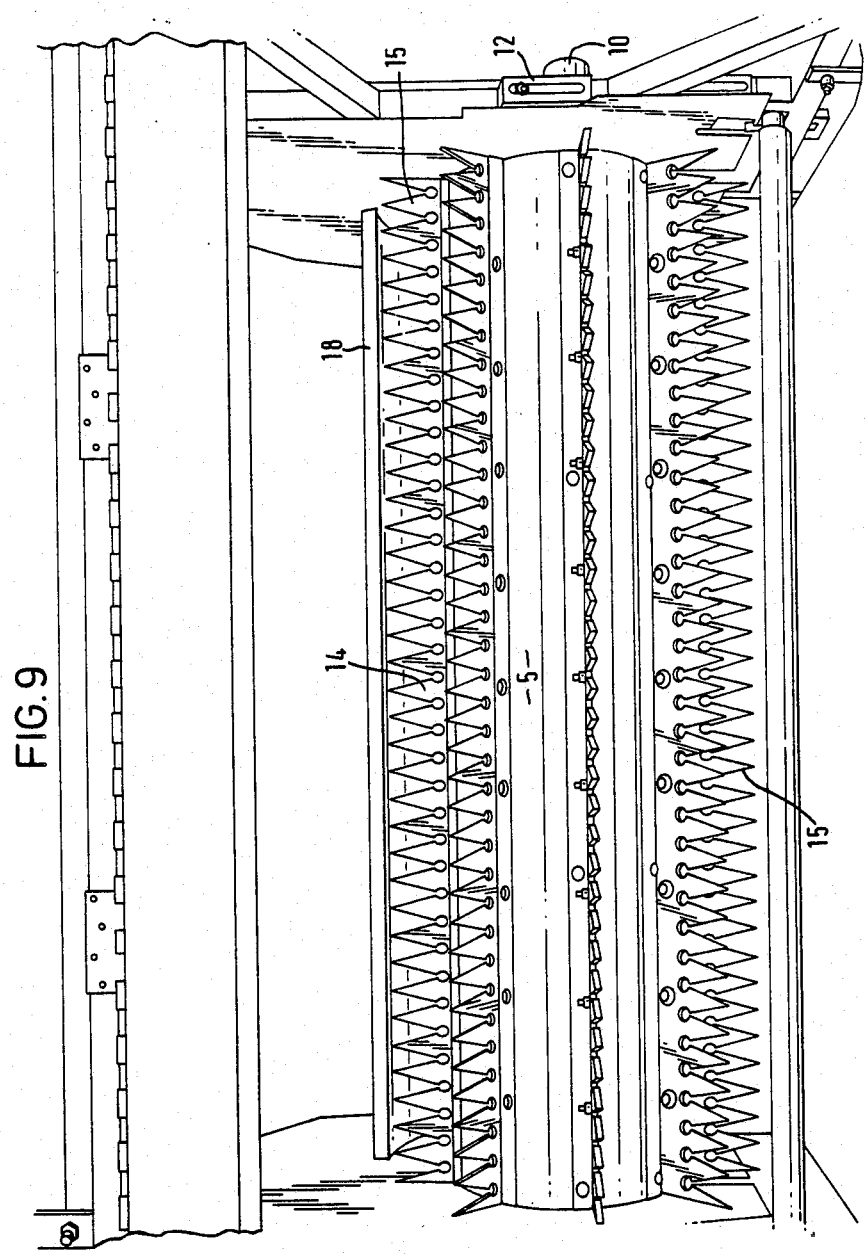
Figure 10:
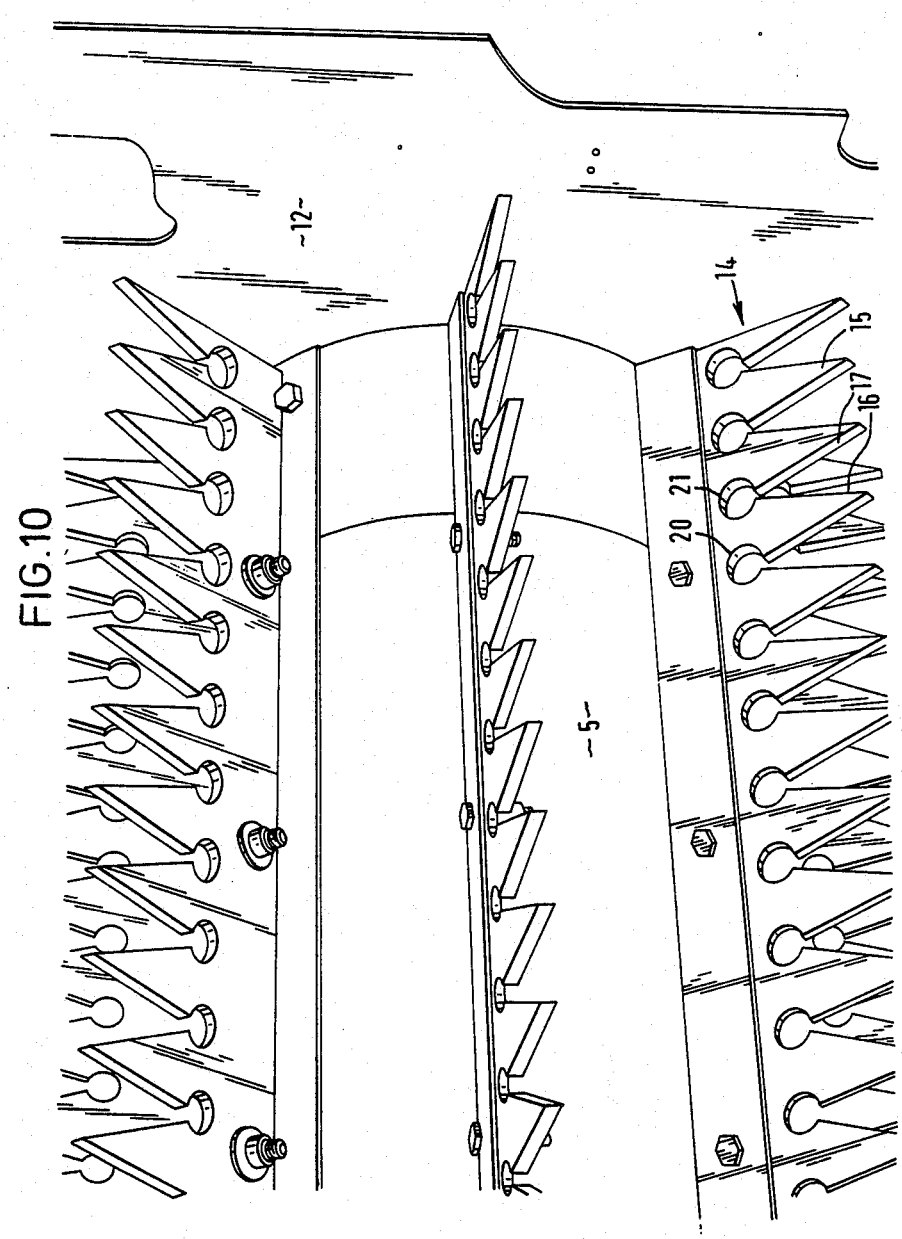
Figure 11:
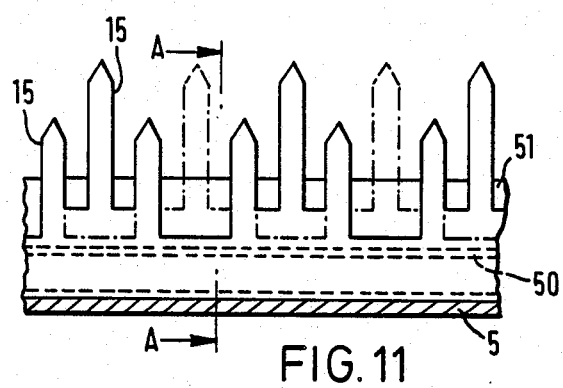
Figure 11A:
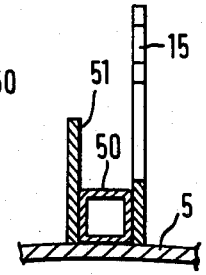
Figure 12:
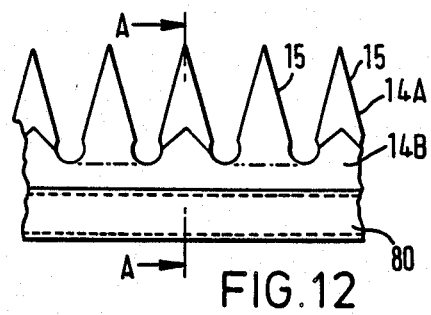
Figure 12A:
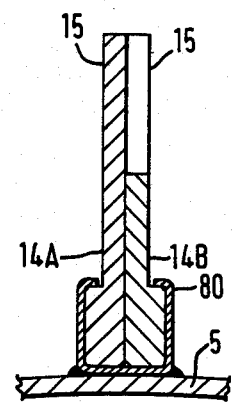
Figure 12B:
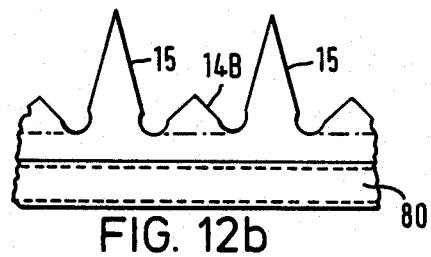
Figure 11B:
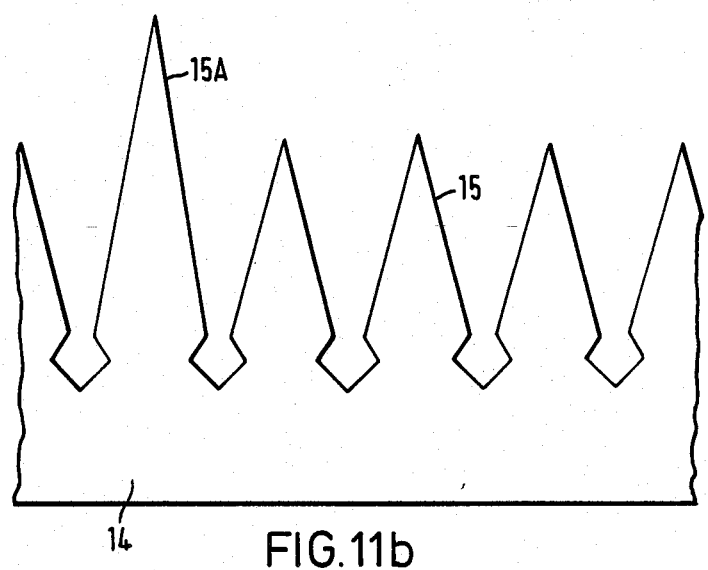
Figure 11C:
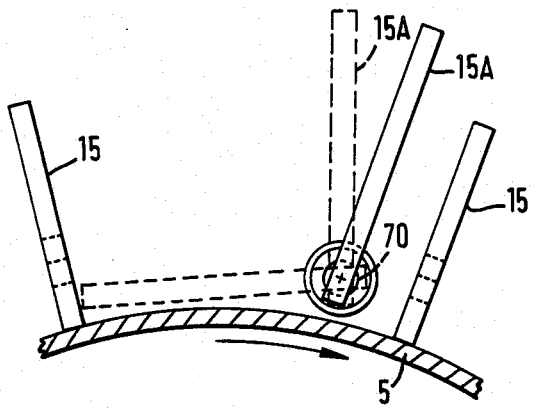

FIGS. 7(a) to (j) show examples of different forms of crop stripping teeth embodying the present invention;

FIG. 8 is a perspective view from the front of crop harvesting apparatus embodying the invention, of the form shown generally in FIG. 1(a);

FIG. 9 is a perspective view from the rear of the apparatus of FIG. 8;

FIG. 10 is a perspective view of portions of stripping combs shown in FIGS. 8 and 9;

FIGS. 11 and 11(a) are diagrammatic front and side views of an alterative form of crop engaging element embodying the invention;

FIG. 11(b) shows a modification of the form of teeth along one of the combs of FIG. 11;

FIG. 11(c) is a diagrammatic side view of part of the surface of the rotor shown in FIG. 11(a), showing a modification in which the effective operating angle of the longer teeth may be varied;

FIGS. 12 and 12(b) show the form of teeth illustrated in FIG. 7d in a sliding double-comb arrangement which allows change from single-pitch to double-pitch operation, and FIG. 12(a) is a diagrammatic side view in section of the sliding comb arrangement in FIGS. 12 and 12(b).

Figure 1B:
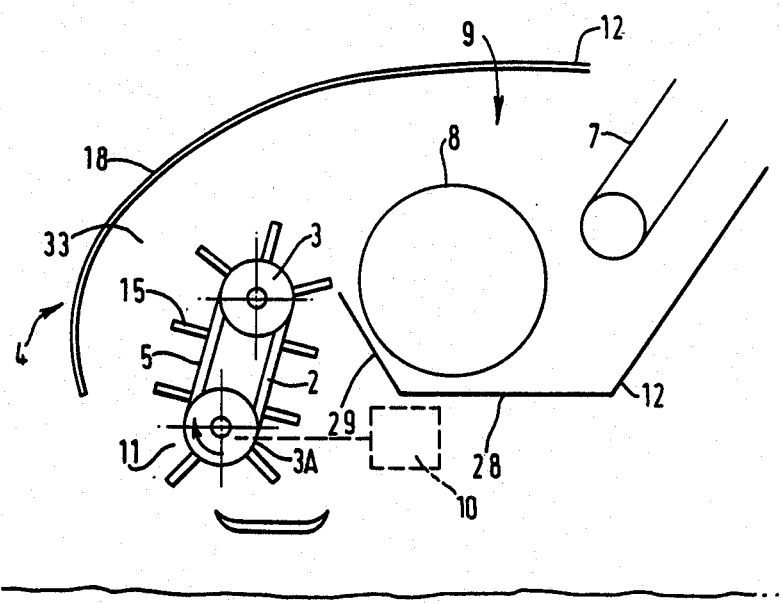
FIG. 1(b) is a diagrammatic side view in section of an alternative general form of apparatus for harvesting crop, embodying the invention.
Figure 1C:
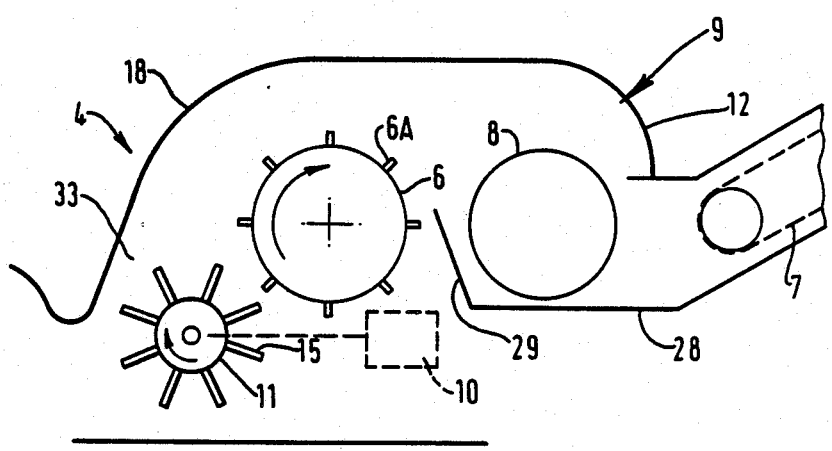
FIG. 1(c) is a diagrammatic side view in section of a further alternative general form of apparatus for harvesting crop, embodying the invention.
Figure 13:
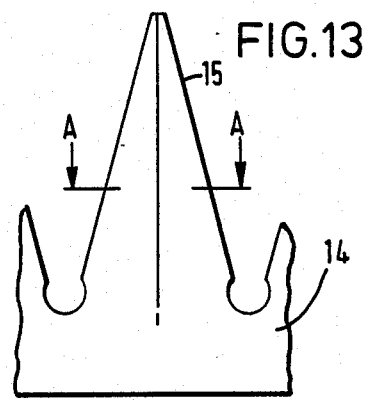
Figure 13A:
Figure 13B:
Figure 14:
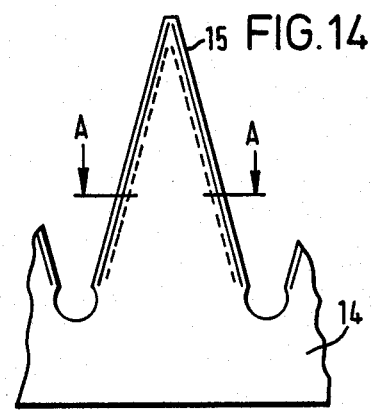
Figure 14A:
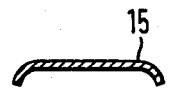
Figure 14B:
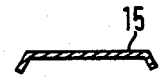
Figure 28:
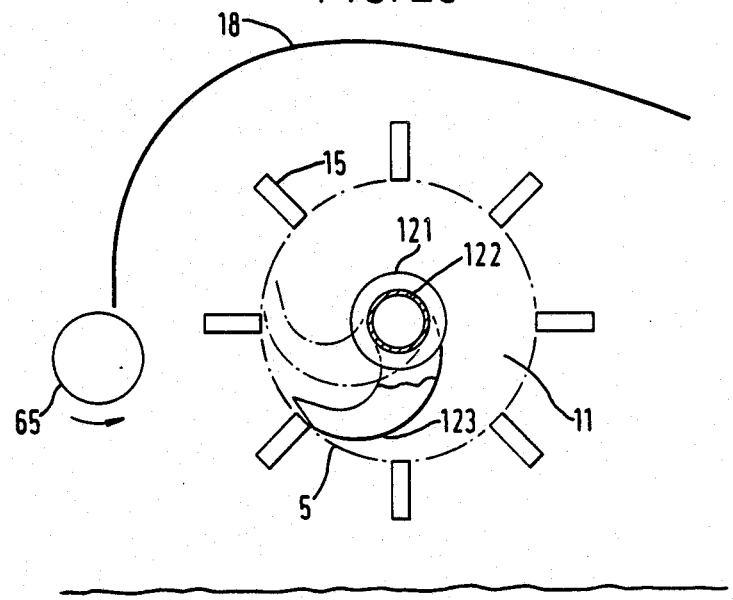
Figure 27:
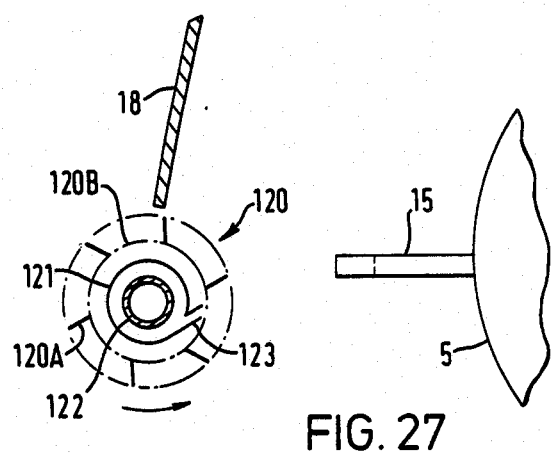
Figure 30:
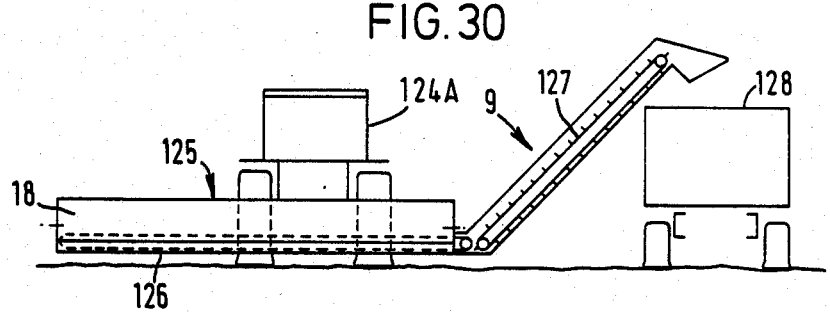
Figure 31:
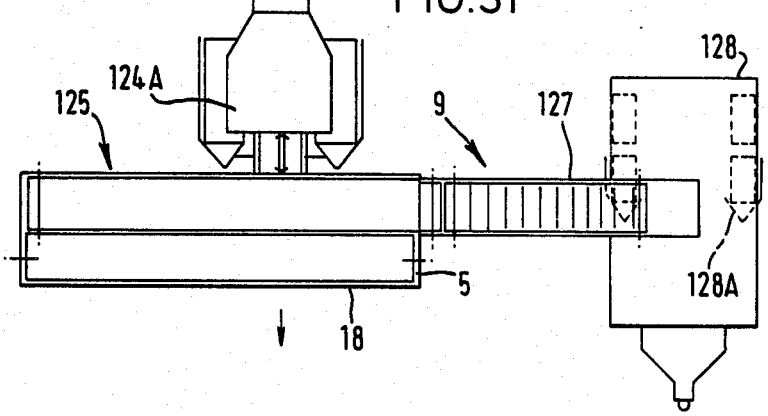
Figure 32:
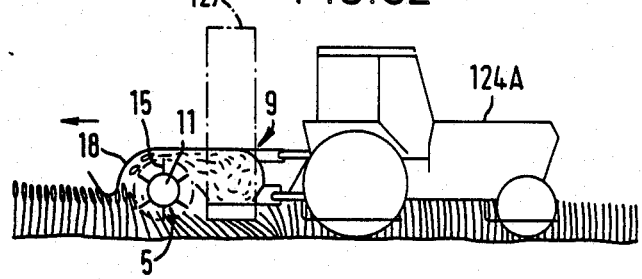
Figure 33B:
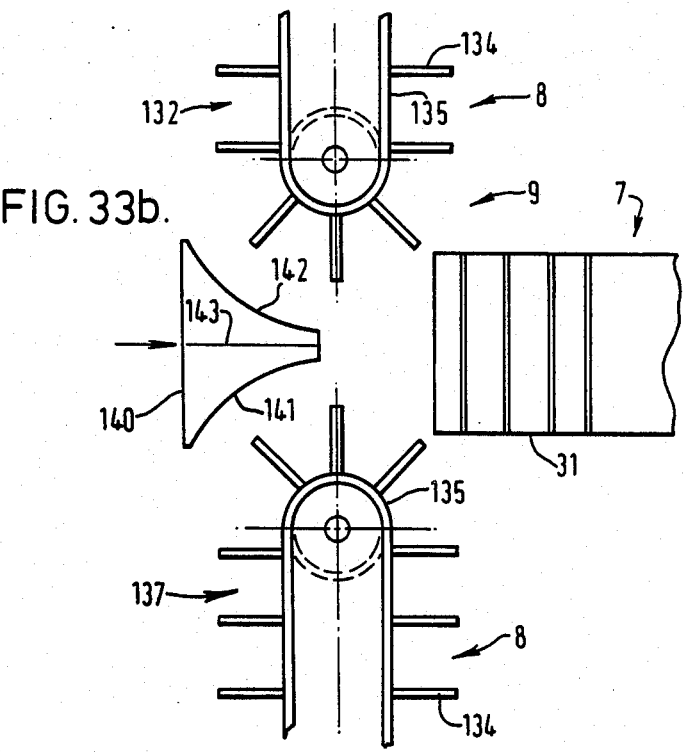
Figure 33A:
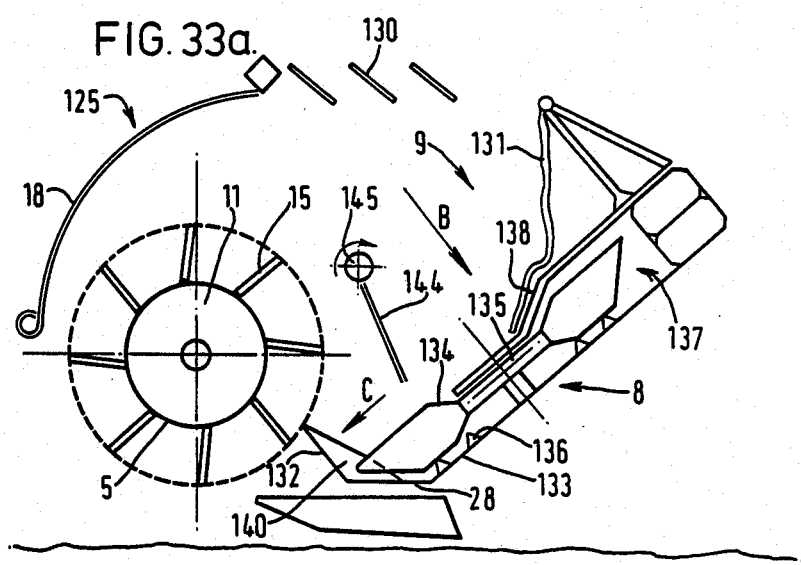
Figure 34B:
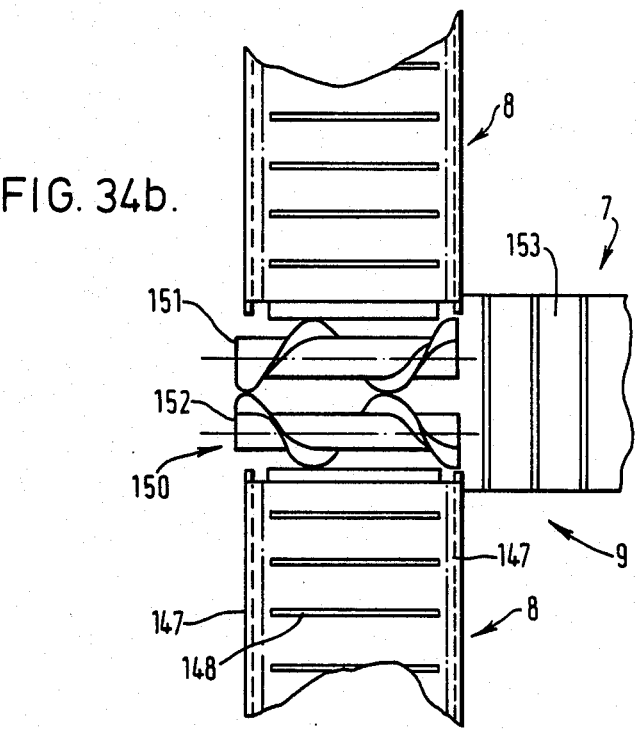
Figure 34A:
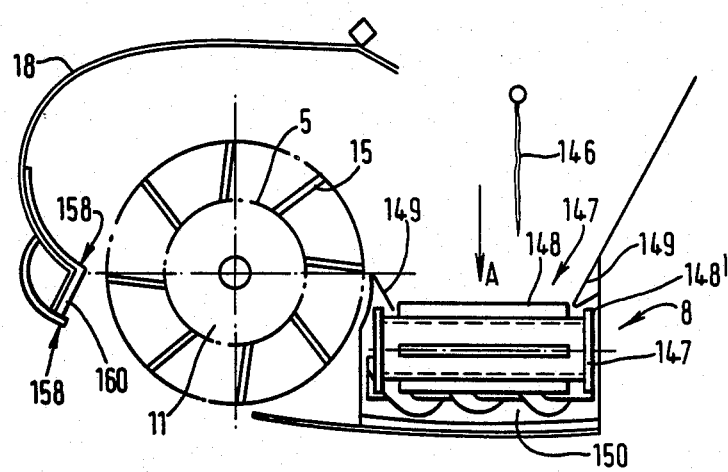
Figure 35:
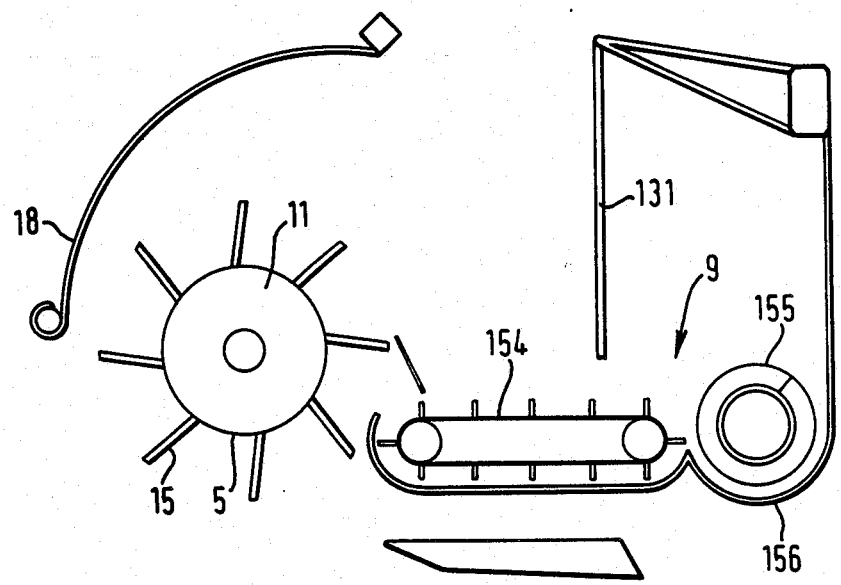
Figure 36:
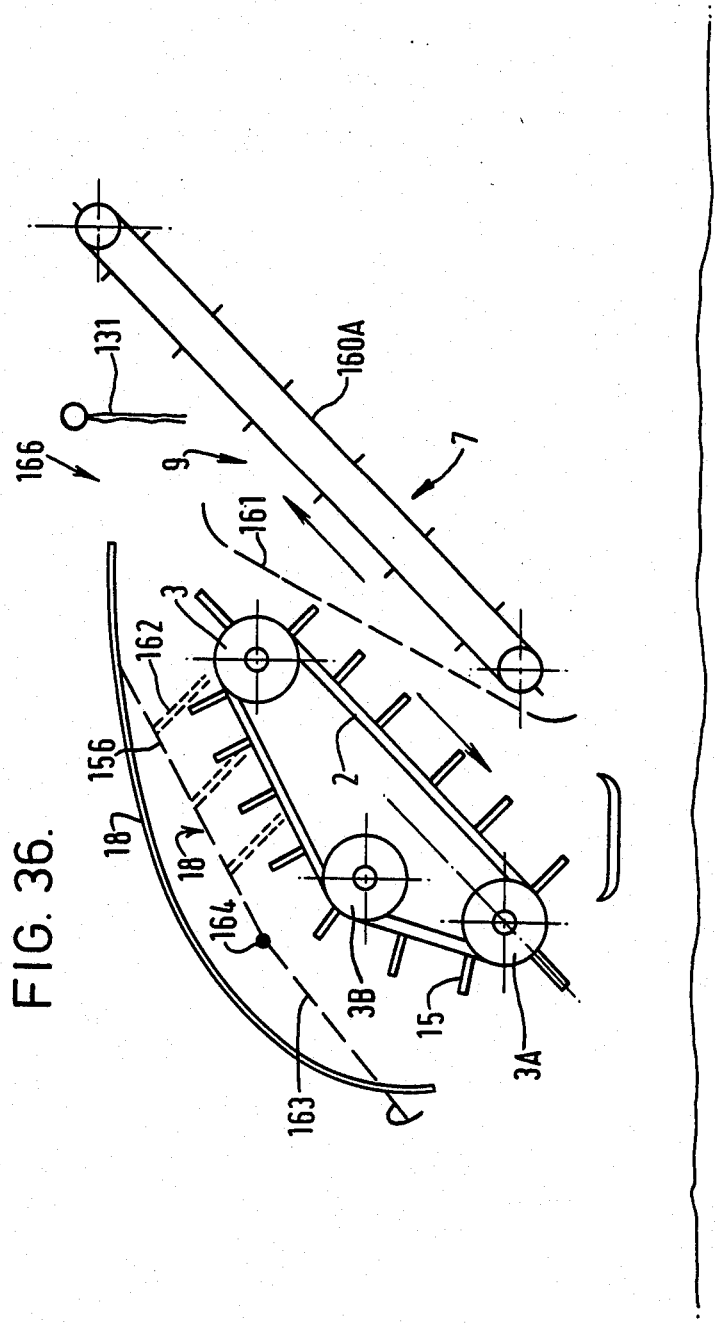
Figure 37:
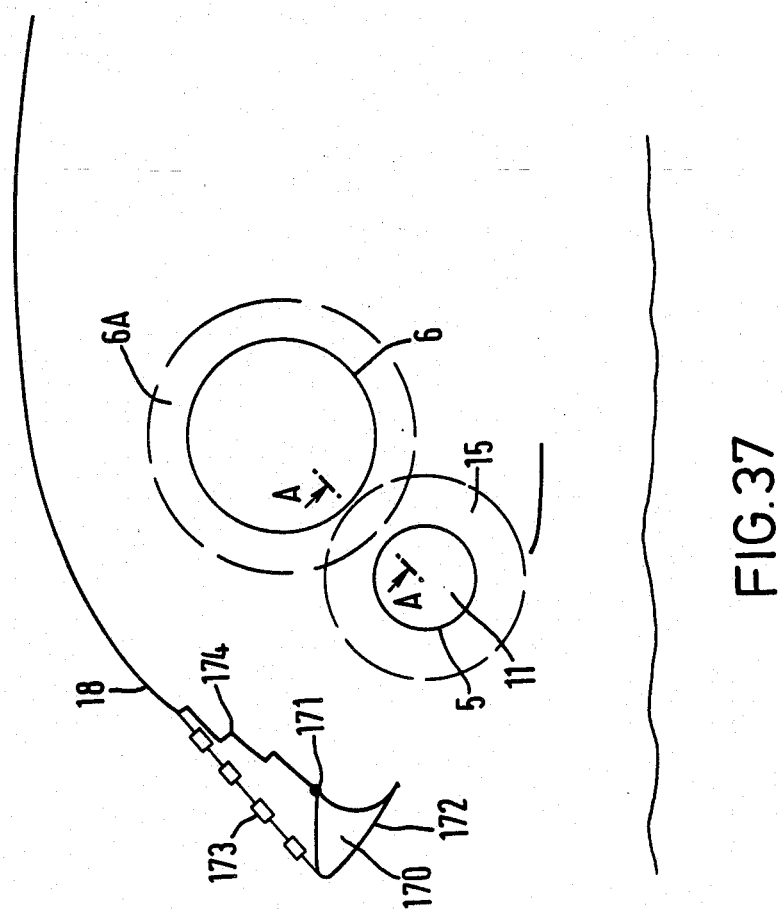

FIGS. 13 and 14 show examples of shapes of individual teeth which may be used in embodiments of the invention;

FIGS. 13(a) and 13(b) show two alternative cross-sections of the tooth shown in FIG. 13, taken along the lines A—A;

FIGS. 14(a) and 14(b) show two alternative cross-sections of the tooth shown in FIG. 14, taken along the lines A—A;

FIG. 15 shows a further modified form of a comb which may be used in embodiments of the invention, and FIG. 15(a) shows a diagrammatic side view in cross-section of the comb, taken along the lines A—A in FIG. 15;

FIG. 16 shows a further modified form of a comb which may be used in embodiments of the invention, and FIG. 16(a) shows a diagrammatic side view in cross-section of the comb taken along the lines A—A in FIG. 16;

FIG. 17 is a diagrammatic side view in section of a modification of the rotor of FIG. 1, embodying the invention, and shows the use of a stationary crop engaging element co-operating with the elements of the rotor, and FIG. 17(a) shows a view of the stationary crop engaging element co-operating with a comb of the rotor, taken along the lines A—A in FIG. 17;

FIG. 18 is a diagrammatic side view in section of a modification of the rotor of FIG. 1, embodying the invention, and shows the use of a stationary crop engaging element co-operating with the elements of the rotor, and FIG. 18(a) shows a view of the stationary crop engaging element co-operating with a comb of the rotor, taken along the lines A—A in FIG. 18;

FIG. 19 shows in diagrammatic side view a considerably modified form of the apparatus shown in FIG. 1, embodying the invention, and illustrates the provision of an additional threshing rotor in front of and above the main crop stripping rotor;

FIG. 19(a) shows in diagrammatic side view an alternative form of the additional threshing rotor of FIG. 19;

FIG. 20 is a diagrammatic side view in section of a modification of the apparatus of FIG. 19, embodying the invention, in which an additional grain threshing rotor is positioned to the rear of the main grain stripping rotor;

FIG. 21 is a diagrammatic side view in section of a further modification of the apparatus shown in FIG. 1, embodying the invention, in which the main stripping rotor is preceded by an octagonal feed roller and there is provided an additional auger for collecting stripped crop parts, positioned to the fore of the main crop stripping rotor;

FIG. 21(a) is a diagrammatic perspective view of part of the apparatus of FIG. 21(a) taken up along the direction of the arrow A in FIG. 21;

FIG. 22 is a diagrammatic side view in section of a modification of the apparatus of FIG. 1, embodying the invention, showing a system for varying the position of the hood relative to the rotor to deal with differing crop conditions;

FIGS. 23 to 26 each show diagrammatic side views in section of modifications of the apparatus of FIG. 1, embodying the invention, in which there are provided varying forms of means for directing forced air flow into the apparatus for feeding crop to the stripping rotor and directing stripped crop material as required, and FIG. 23(a) shows a front view of a series of outlets which may be provided across the width of the rotor cover in connection with the forced air flow;

FIG. 27 is a diagrammatic side view in section of a part of the apparatus shown in FIG. 1, embodying the invention, and shows a feed-assisting roller at the front lower edge of the rotor cover, which may be adapted to be provided in various of the embodiments illustrated in other Figures, as an alternative form of directing forced air flow as set out in FIGS. 24 to 26;

FIG. 28 shows a diagrammatic side view in section of a modified form of the apparatus of FIG. 1, embodying the invention, showing provision of an air duct positioned within the main stripping rotor;

FIG. 29 shows in diagrammatic side view, partly in section, a harvesting apparatus embodying the invention and generally in the form of a conventional combine harvester in which a stripping apparatus embodying the invention replaces the conventional cutting table of the combine harvester;

FIG. 30 is an outline front view of a stripping apparatus embodying the invention, delivering detached material onto a transverse belt conveyor and then onto a cleated-belt elevator for delivery into a bulk trailer;

FIG. 31 is an outline plan view of the apparatus shown in FIG. 30;

FIG. 32 is an outline side view, partly in section, of the stripper harvester shown in FIG. 30;

FIGS. 33(a) and 33(b) show respectively a diagrammatic side view partly in section and a diagrammatic plan view, of a modification of the apparatus shown in FIG. 1, embodying the invention, in which there is provided to the rear of the main stripping rotor various crop directing and arresting and transverse and longitudinal crop conveying means;

FIGS. 34(a) and 34(b) show respectively a diagrammatic side view partly in section and diagrammatic plan view, of a further modification of the apparatus shown in FIG. 1, embodying the invention, in which there are provided to the rear of the main stripping rotor various crop directing and arresting and transverse and longitudinal crop conveying means;

FIG. 35 is a diagrammatic side view in section of a modification of the crop collecting arrangements shown in FIG. 34 (a);

FIG. 36 is a diagrammatic side view in section of a modification of the apparatus shown in FIG. 1(b), embodying the invention, in which a preferred form of stripping conveyor is shown;

FIG. 37 is a diagrammatic side view in section of a modification of the apparatus shown in FIG. 1(c) embodying the invention, in which a preferred form of two-rotor stripping arrangement is shown; and FIGS. 38(a) to (d) show various forms of crop engaging elements which may be used in the apparatus of FIG. 37, and show views along the direction of arrows A—A in FIG. 37.

Throughout this specification, corresponding components of the various arrangements shown are indicated by like reference numerals. For simplicity, the functions and inter-relationships between the various components are not described in connection with each figure when these have been described previously. It is particularly to be appreciated that where corresponding components have like reference numerals, the appropriate description applies equally each time those elements are referred to.

Referring first to FIG. 1(a) there is shown in diagrammatic side view the generalised layout of an embodiment of the present invention for harvesting crop. The apparatus comprises a mobile frame for movement over the ground, indicated generally at 12. Mounted on the frame 12 is a moveable support means 5 which in the example shown is a rotor 11, although other support means may be used such as a conveyor belt.

Mounted on the rotor 11 are a plurality of outwardly projecting crop engaging elements 15, which may take a number of forms in accordance with the invention, as has been described hereinbefore or will be described hereinafter.

The rotor 11 is driven by drive means indicated diagrammatically at 10 which may conveniently comprise a gear box and power train driven by a tractor, or other power source such as the engine of a combine harvester. The rotor 11 is driven in the so-called overshot mode so that the crop engaging elements 15 are moved in an upward direction at the front of the apparatus. There are provided guide means 4 co-operating with the crop engaging elements 15 to form a crop flow passage 33. In the example shown, the guide means 4 are constituted by a hood or cover 18 which extends around at least part of the front half of the rotor and defines with the rotor elements 15 the crop flow passage 33 along which crop is conveyed by the rotor. The hood or cover 18 prevents forward projection of parts of the crop detached by the rotor 11.

In operation, rotation of the rotor 11 moves the crop engaging elements 15 so that the distal tips of the elements enter the crop with minimum disturbance of the stems 19 of the crop. The elements 15 then move upwardly through the crop, gathering one or more crop stems. As the elements 15 reach the upper parts of the crop the required parts to be detached are detached by rubbing and/or breaking and/or tearing the parts from the stems.

After the detachment, the required crop parts are conveyed upwardly and rearwardly over the rotor 11, and pass to crop conveying means indicated generally at 9, and positioned within a collecting trough 28 having a front wall 29 in close proximity to the rear of the rotor 11. Usually the crop transfer means 9 will include means for transferring crop laterally, indicated diagrammatically at 8, and means for conveying the crop rearwardly, indicated diagrammatically at 7. Conveniently the transverse crop transfer means 8 may be an auger, but may alternatively be a transverse conveyor belt. Conveniently the rearward crop transfer means 7 may be a conveyor, for example a slatted chain conveyor, although other means may be provided.

In FIG. 1(b) there is shown in diagrammatic side view the generalised layout of an alternative embodiment of the present invention, also for harvesting crop. The apparatus again comprises a mobile frame 12 for movement over the ground, and mounted on the frame 12 is a moveable support means 5 carrying a plurality of outwardly projecting crop engaging elements 15, which may take a number of forms in accordance with the invention, as has been described hereinbefore or will be described hereinafter. Except for the moveable support means 5, the other components of the apparatus of FIG. 1 correspond generally to those shown in FIG. 1(a), and in general the description given with regard to FIG. 1(a) applies also to FIG. 1(b).

The moveable support means 5 in the apparatus of FIG. 1(b) comprises a conveyor 2 mounted for movement around two sets of pulleys or other guides 3 and 3A. The elements 15 are mounted on the conveyor 2, which is driven by drive means indicated generally at 10, in a direction such that the elements 15 move upwardly and rearwardly at the front of the apparatus. An example of this form of the invention will be described in more detail hereinafter with reference to FIG. 36.

In FIG. 1(c) there is shown in diagrammatic side view the generalised layout of a yet further alternative general form of the present invention for harvesting crop. Again, in general the components shown in FIG. 1(c) correspond to those shown in FIGS. 1(a) and 1(b), the only difference being in the form of a moveable support means 5 which is provided. Again, the description which has been provided with regard to FIG. 1(a) is in general applicable also to the apparatus of FIG. 1(c).

In FIG. 1(c) the moveable support means 5 is provided by a rotor 11 of smaller diameter than that shown in FIG. 1(a), and this rotor operates in close co-operation with a second rotor 6 (in the example a conveying drum), which is provided to the rear of and above the stripping rotor 11. The second rotor 6 carries crop conveying elements 6A (in the example relatively shallow ribs extending across the width of the drum, and spaced around its circumference). In the embodiment of FIG. 1(c), the functions of stripping and conveying which in FIG. 1(a) are carried out by the rotor 11, are divided between the rotors 11 and 6, with the rotor 11 being provided chiefly for stripping crop, and the rotor 6 being provided for conveying the crop upwardly and rearwardly over the rotor 6 to the crop transfer means 8 at the rear of the apparatus and to prevent crop wrapping around the rotor 11. As an alternative to shallow ribs, the rotor 6 may be fitted with deeper ribs of serrated profile, to intermesh in an overlapping mode with the combs on the rotor 11. In that form it positively prevents wrapping of crop around the rotor 11, even if the rotor has a smaller diameter than shown. Such an arrangement will be described hereinafter with reference to FIGS. 37 and 38(a) to (d). As with the arrangements of FIGS. 1(a) and 1(b), the embodiment of FIG. 1(c) may utilise any of the forms of crop stripping elements described hereinbefore or as will be described hereinafter, and may also utilise any features of the invention described herein.

It is particularly to be appreciated that the arrangements of FIGS. 1(a) (b) and (c) indicate general layouts of apparatus embodying the invention, and that the various components shown may be provided in practice by any of the appropriate components which have been described hereinbefore, or are to be described hereinafter.

Referring now to FIG. 2, and FIGS. 8, 9 and 10, there is shown one form of a crop stripping apparatus embodying the invention, which conveniently may be used as a header for a combine harvester, or may be used in conjunction with other threshing and grain separating apparatus. FIG. 2 shows one particular form of the apparatus shown generally in FIG. 1(a).

(The particular examples shown in FIGS. 8, 9 and 10, should also be taken to illustrate, when appropriate, any of the forms of the invention shown diagrammatically in other figures, when those forms utilise crop engaging elements of the configuration shown in FIGS. 8, 9 and 10).

The apparatus comprises a rotor 11 mounted in a main frame 12 for movement through the crop to be harvested. The rotor 11 comprises an inner core 13 generally in the form of a circular section or multi-sided cylinder, and a succession of transverse combs 14 spaced circumferentially around the rotor 11. As shown in FIGS. 8, 9, and 10, each comb 14 maybe formed from a transverse rib of solid material shaped to provide an array of teeth 15 mounted in a row transverse to the direction of movement of the harvesting apparatus through the crop. Each tooth 15 has side edges 16 and 17 which diverge from each other in a direction away from the distal tip of the tooth 15.

There is provided at the junction of each adjacent pair of side edges 16 and 17 of adjacent teeth 15, an enlarged aperture 21, which in the example shown, is part circular Each aperture 21 is formed by relieved portions of adjacent teeth at the base regions thereof. Thus each tooth has a portion at or in the region of its base which is narrower than the widest part of the portion which has diverging side edges. In the examples shown, each comb is formed from a flat sheet-like rib of solid material, having cut therein, or otherwise formed, a series of keyhole shaped apertures, forming the said teeth.

The rotor 11 is driven to rotate in the so-called overshot mode, so that the combs 14 are moved in an upward direction at the front of the apparatus. There is provided over the front of the rotor 11 a hood or cover 18 to prevent forward projection of parts of the crop detached by the rotor 11.

In operation, rotation of the rotor 11 moves the combs 14 so that the narrow or pointed distal tips of the teeth 15 enter the crop with minimum disturbance of the stems 19 of the crop. The teeth 15 then move upwardly through the crop, gathering between adjacent side edges of adjacent teeth one or more crop stems. As the teeth 15 reach the seed-bearing heads of the crop, the seeds, or seed heads, are detached by rubbing the seeds free, or snapping off the seed heads. The seeds and seed heads are removed by engagement of the crop with the side edges 16 and 17 of the teeth, and by engagement with the edges 20 of the apertures 21 at the base of the junctions of adjacent side edges 16 and 17.

As shown in FIG. 2, there is provided to the rear of the rotor 11, an overhead housing 23 containing a secondary transverse auger 24 above a trough 25. Between the auger 24 and the rotor 11, is a grid 26 of curved wires, rods or longitudinally orientated flat strips spaced apart transversely. To the rear of the rotor 11, and beneath the upper auger 24, is a main transverse auger 27 mounted in a trough 28 having a front wall 29 in close proximity to the rear of the rotor 11. In the centre section, the auger 27 is provided with steered fingers 30 in the manner of a conventional combine auger. To the rear of the main auger 27 is a conventional slatted-chain crop conveyor 31 for transporting crop upwardly and rearwardly into a threshing, separating and cleaning mechanism, a is normally provided on grain harvesters.

The operation of the apparatus is as follows.

The cover 18 forms with the rotor 11 a crop flow passage 33. An upturned leading portion 32 of the cover usually engages crop first during forward movement of the apparatus. The upturned leading portion 32 of the rotor cover 18 engages the crop and preferably seals off the crop passage 33 immediately in front of the overshot rotor 11.

Material including grain and grain heads is dislodged and then impelled upwardly and rearwardly along the passage 33, by the effect of the combs 14. The overhead hood 18 is important in avoiding forward protection of grain and grain heads. The hood produces a funnel effect so that grain is guided into the machine rather than being ricochetted back onto the ground. Behind the rotor 11, the dislodged material is thrown against the grid of curved wires, rods or fins 26, which are spaced apart transversely sufficiently to allow small particles such as grain to pass, while directing larger fragments such as grain heads downwardly into the main, undershot, centre-delivering auger 27. The curved wires, rods or fins 26 act as deflectors and separators.

The auger 27 operates within the trough 28, which has a sufficiently high wall 29 at the front to avoid spillage of material. In the centre section of the auger 27, the steered fingers 30 deliver grain heads and other larger dislodged material positively into the path of the slatted-chain crop conveyor 31 for transportation upwardly and rearwardly into a threshing, separating and cleaning mechanism such as is usually provided on grain harvesters.

The smaller auger 24 above the main auger 27 is optional. Where provided, the auger 24 collects smaller particles such as separated grain, which can then be transferred directly to the cleaning device (not shown) bypassing the threshing mechanism (also not shown). If the secondary auger 24 and grid 26 are not provided, any small material such as grain will fall behind the main auger 27 to the bottom of the trough 28 and be brushed into the crop elevator 31 by the effect of the coarser material. Alternatively, the curved grid 26 in front of the secondary auger 24 in the apparatus of FIG. 2 can be blanked off if all the harvested material is to be collected together.

The stripped crop stems 19 pass under the machine and remain standing in the field. To avoid straw being pressed into the ground by tractor or machine wheels, dividers may be fitted in front of the wheels to force the crop residue apart temporarily.

It will normally be necessary to provide means for adjusting the height above ground of the stripping rotor 11 so as to be at the correct height in relationship to the height of the seed-bearing heads or other required parts of the crop. The height above the ground of the stripping rotor unit alone may be varied, or the height of the whole header arrangement may be varied according to conditions. For example, the rotor will need to be lowered in order to gather the desired material efficiently where crops are exceptionally short or laid. Proximity sensors may be attached at the front of the stripping rotor cover 18, and the output signal may be used to keep the rotor height adjusted automatically in relation to the crop horizon and/or to adjust the height of the rotor cover.

A gap 34 is shown between the stripping rotor hood 18 and the housing 23 over the crop augers 24 and 27, and this is provided optionally to give a view of the crop stream to the harvester operator when, as is normally the case, he is positioned on a self-propelled harvester at an elevated level.

It should be noted that by adjustment of the speed of the combing ribs 14, together with appropriate arrangements of the geometry of the components, selective harvesting of only the ripest seed, particularly of herbage seed, may be effected during successive passes of the crop.

The present invention provides a number of advantages, in particular where the invention is applied to stripping grain from standing crop such as wheat, barley and oats. Grain stripping of standing crop leaves the straw standing rather than leaving cut straw from a combine harvester. The standing straw is easier to chop for subsequent disposal, than is the randomly orientated cut straw which is left spread or in spaced windrows by a combine harvester. Grain crop harvested in accordance with the present invention can, at least in preferred embodiments, have a higher proportion of grain to material other than grain, compared with the material collected by a combine harvester. In consequence higher work rates become possible, because in a combine harvester these are related principally to the throughput of straw. Finally, at least in preferred embodiments, the apparatus often leaves less wasted grain and grain heads in the field than does a conventional combine harvester.

Although the apparatus has been described with reference to a rotor 11 carrying the combs 14 as shown in FIG. 1(a) and FIG. 2, it is to be appreciated that the combs 14 of all the various kinds shown can equally well be mounted on a conveyor belt mounted about two or more rollers or sets of pulleys, for example as shown in FIG. 1(b) and FIG. 36. In such a case the front roller 4 of the conveyor-type belt 2 is positioned so that the combs 14 are moved upwardly and rearwardly over the front roller 4 of the conveyor belt 2, at an appropriate position at the front of the apparatus so as to produce the same effect on crop as is produced in the apparatus of FIGS. 1(a) and 2 by the rotor 11.

FIGS. 2(a) to 6 show various modifications of the apparatus shown in FIG. 1(a), and in these subsequent Figures corresponding components of the apparatus will be indicated by like reference numerals.

Figure 2A:
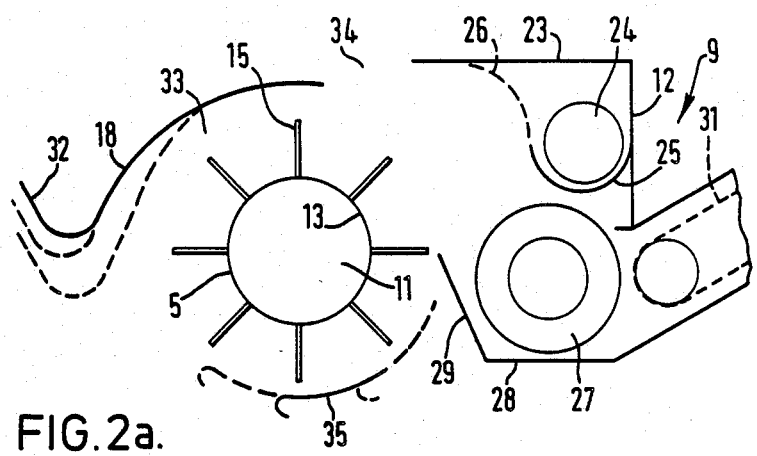
FIG. 2(a) is a simplified diagrammatic side view in section of a modification of the apparatus of FIG. 1, embodying the invention, showing adjustments which may be made to the apparatus.

FIG. 2(a) shows diagrammatically a concave plate 35 which may be positioned below the stripping rotor 11, and which may be adjusted as shown in dotted lines, for example around a circle centred at the axis of the rotor 11. Also as shown in dotted lines in FIG. 2, the cover 18 may be extended to move the upturned end section 32 downwards and/or it may be moved closer to the rotor. In combination, the adjustments of the front rotor cover 18 and the concave plate 35, control the amount of engagement of the rotor 11 with the crop. By also altering rotor speed and height, the severity and extent of engagement from the top of the crop downwards may be limited. A further function of the plate 35, particularly of the leading downturned edge, beneath the stripping rotor 11, is to help resist any tendency for weakly anchored crop to be pulled out during the stripping operation, for example in very light and wet soils. The plate 35 may be fixed in a chosen position, or it may be allowed to float in an arcuate slot arrangement.

Figures 3, 3A:
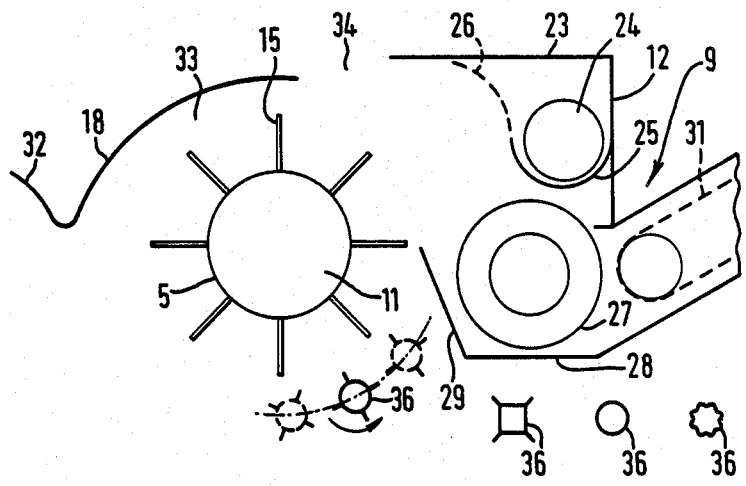
FIG. 3 is a diagrammatic side view in section of a modification of the apparatus of FIG. 1, embodying the invention, showing an optional device for reducing the risk of uprooting of crop.
FIG. 3(a) is a diagrammatic sectional view of alternative rotors which may be used in the apparatus of FIG. 1.

In FIG. 3 there is shown an alternative means for reducing any tendency to uproot crop during the stripping process. A ribbed roller 36 is provided beneath the rotor 11, and may be secured in a wide range of positions, or may be allowed to float within set limits. The roller 36 may be driven, or allowed to idle, or may be secured as a fixed element. In FIG. 3c there are shown some alternative shapes of the roller 36 which may be adopted, amongst others.

Figure 4:
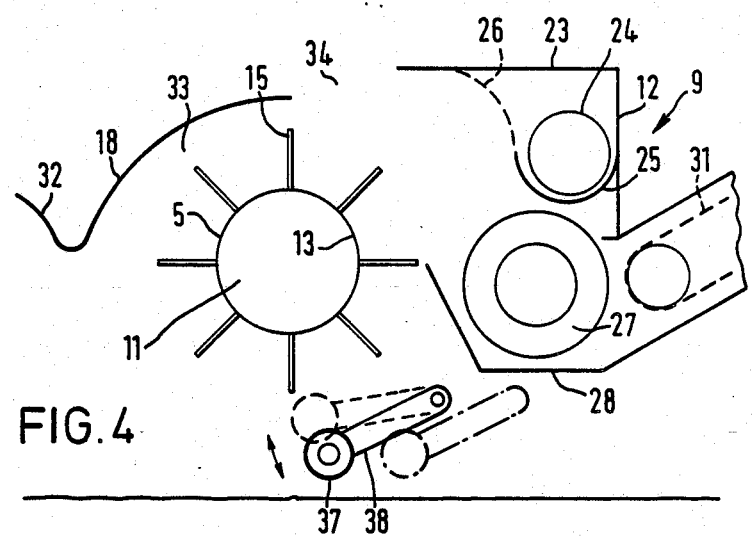
FIG. 4 is a diagrammatic side view in section of a modification of the apparatus of FIG. 1, embodying the invention, including a protecting and height limiting device

In FIG. 4, a further roller 37 is shown suspended on ink arms 38. The roller is provided as protection for the stripping rotor 11, as a height limiting device, and also as a crop braking device to reduce uprooting of crop. As shown in broken lines, the roller 37 may be held in a number of alternative fixed positions, or may be spring loaded.

Figure 5:
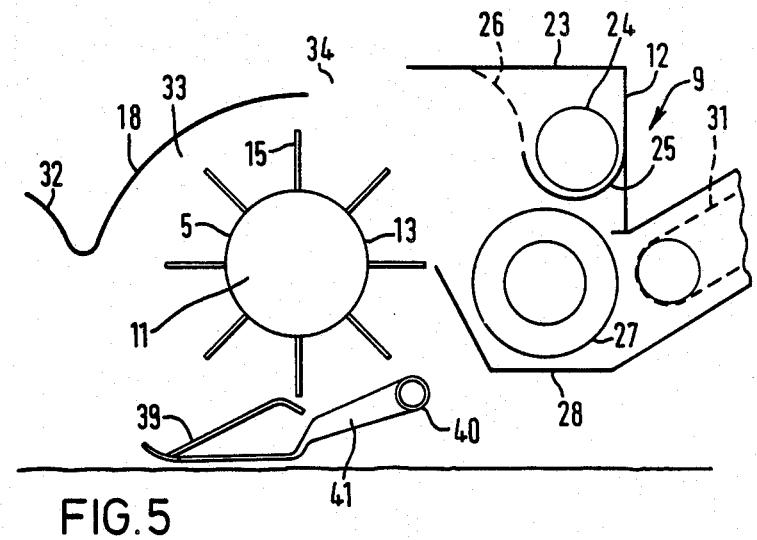
FIG. 5 is a diagrammatic side view in section of a modification of the apparatus of FIG. 1, embodying the invention, in combination with an array of crop lifters.
Figure 5A:
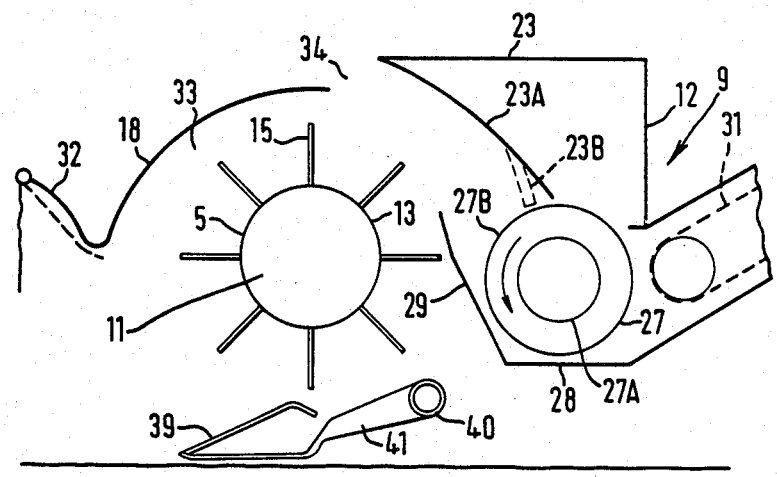
FIG. 5(a) is a diagrammatic side view in section of a modification of the arrangement of FIG. 5 illustrating also use of a flexible curtain at the front.

FIG. 5 shows apparatus embodying the invention for use in cereal harvesting, and shows a combination of a stripping rotor 11 with crop lifters 39. Instead of being attached to a cutter bar of a combine harvester, the crop lifters 39 are fitted to a transverse beam 40, and linking fins 41 are provided in such a way that there is minimal interference with remaining straw. The crop lifters 39 are an optional aid which may remove the need for lowering the stripping rotor 11 to such an extent that damage may result or the harvested material may be contaminated with soil.

It is to be appreciated that the crop lifters 39 shown in FIG. 5 are not crop stripping or dividing elements contributing to the crop stripping of the invention. The crop lifters 39 are provided merely in order to lift the crop from a laid condition and offer it to the rotor. Thereafter the rotor elements enter the crop and perform the stripping without any requirement for stationary guides supporting the crop during the stripping process.

FIG. 5 (a) discloses a modification of the apparatus of FIG. 5 and shows an arrangement for guiding the crop coming from the front of the rotor 11 onto a conventional transverse conveying auger so that the bulk of the grain is deflected rearwards by the auger core 27A but any bulky material is deflected forwardly by the rotating auger components 27B. To achieve this separation, a deflecting surface 23A above the auger may be straight or curved but must direct the material into the region of the top-dead-centre of the auger unit 27. To the grain moving close to the deflecting surface 23A, the flighting 27B of the auger 27 represents no major obstacle and, consequently, it bounces rearwards off the auger core cylinder 27A. Any bulky crop material, when it comes into contact with the auger flighting 278 and core 27A, will be directed forwardly and downwardly to be fed into the crop elevator in the way which is normal on combine harvesters.

Improved separation and flow of the bulky material is achieved if a lower, downstream section 23B of the crop guide means consists of transverse fins which allow only the short material through. As an alternative to the fins, the whole of the guide surface 23A may be corrugated or fluted in a pronounced manner; the heavier (seed) fraction will then tend to move in the bottom of the grooves whilst the bulky material is held further forward by the ridges.

It should be understood that it is not necessary as shown, to allow the separated fractions to re-combine but provision may be made for the heavy material to be collected separately. It should also be understood that the transverse auger 27 may be replaced by other transverse conveying systems, for example belt conveyors, slatted-chain conveyors, jog troughs, etc. By the dividing means which has been described above, the crop stream may be separated and the separation maintained if the bulky and heavy fractions are deflected onto adjacent separate conveyors which may, optionally, operate in opposite directions.

To prevent crop particles, especially grain or seed from splashing forward and becoming lost, when impelled by the stripping rotor 11 in unevenly tall crops or when the header pitches transversely on rough ground, a flexible crop curtain 32A is suspended from the leading edge of the front section 32 of the rotor cover 33, to provide more effective sealing against the crop horizon. The flexible curtain 32A also allows the operator more latitude in setting the height of the header. The deflected curtain is shown in broken outline.

Figure 6:
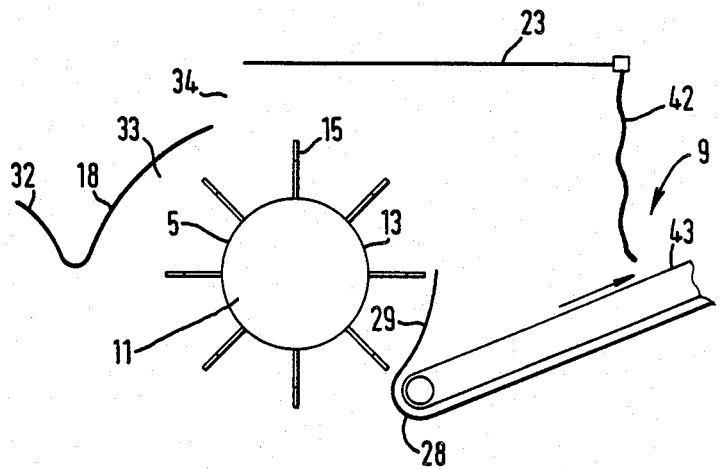
FIG. 6 is a diagrammatic side view in section of a modification of the apparatus of FIG. 1, embodying the invention, illustrating use of a flexible curtain and an anti-splash wall in the region receiving stripped parts of the crop.

In FIG. 6, a modification is shown of the apparatus of FIG. 1(a). The relationship between the hood 18 over the front of the stripping rotor 11, and the top cover 23, is such that the driver of a tractor pulling a rearwardly offset harvesting apparatus of the invention can observe the flow of material to the rear. A curtain 42 of heavy-gauge resilient sheeting arrests the stripped crop, particularly herbage material, and causes it to be deposited on a subsequent conveying means, for example a belt conveyor 43, as shown, or into an auger or the like.

Where it is desirable to cut the stripped stalks immediately after harvesting of seeds, or foliar material for example to promote rapid drying of the green herbage residue, a crop cutting mechanism can be fitted immediately behind and beneath the stripping apparatus or belt conveyor of FIG. 6, with appropriate means for collecting separately the cut stalks, if required.

FIG. 6(a) is a diagrammatic side view of a further modification of the embodiment of FIG. 1(a) and illustrates the concept of a crop feeding and support roller 65 beneath the front edge of the rotor cover 18. In this example, the guide means 4 defining the crop flow passage 33, includes the cover 18 and the roller 65. The roller 65 may be plain, ribbed or corrugated in cross-section, or otherwise suitably profiled transversely or spirally either continuously or intermittently, e.g. dimpled, to prevent grain becoming dislodged, crop tending to wrap, and grain impelled by the stripping rotor from passing forwardly and becoming lost. Preferably the roller 65 is a solid roller. The front roller 65 may be left to rotate freely, or may be driven in the opposite sense to the stripping rotor from less than forward speed to several times forward speed, according to the crop being harvested, and prevailing conditions. Height position relative to the front-dead-centre position of the stripping rotor 11, when seen from the left-hand side of the header, can be arranged from below 6 o'clock to around 10 o'clock positions. The horizontal distance of the front roller 65 from the periphery of the stripping rotor 11 depends on the relative height setting and on the crop and its condition; it can range from minimal clearance to over 300 mm. The diameter of the roller 65 can vary from less than a quarter of, to greater than, the diameter of the stripping rotor 11, especially when the latter is small, as is necessary when defoliating or stripping seed from short or ground-hugging crops. Alternatively, for slow-speed applications, a front rotor 65 with three, four, or more paddles with plain or profiled edges, or with short curved or straight tines, or with teeth may be provided.

In FIG. 6(a), a baffle or splash plate 67 over most of the upper rear quadrant of the stripping rotor prevents richochetting grain from re-entering the rotor 11 but allows late entry of grain to the trough 28 from the rotor 11 by passing under the splash plate 67. Above the splash plate 67 are optionally provided two staggered banks of thin metal fins 68 covering the entrance to a grain auger 24. The fins 68 allow free grain to pass but direct large fragments, for example unthreshed heads or parts thereof, downwardly into the feed auger 27 of a combine harvester or re-thresher.

In FIG. 6(c) there is shown a view in the direction of the arrows C—C in FIG. 6(a). Referring to FIGS. 6(c) and 6(e), there is provided, surrounding part of the lower rear quadrant of the stripping rotor 11, a curved, extendable plate arrangement 35. In the example shown in FIG. 6(c), the elements 15 are serrated combs 14 as shown in FIGS. 8 to 10. At the lower forward end of the extendable plate arrangement 35, a serrated edge 35 registers with the teeth of the elements 15, directing any stray seed or crop fragments which may have been carried round by the stripping rotor 11 upwards at the front so that they may be re-circulated. Additionally, the plate arrangement 35A at the lower front edge protects the rotor 11 against ground contact and reduces the pull by the elements 15 on the crop before, during or after stripping, depending on crop presentation and the setting of the adjustable plate.

In FIG. 6(b) the grain auger behind the separating fins 68 is shown to have been replaced by loosely suspended strips 70 of impact-absorbing material which direct grains or short material after passing through the separating screen 68 to fall behind the transverse crop auger 27, whilst the coarse material is directed in front of the auger 27.

Figure 6D:
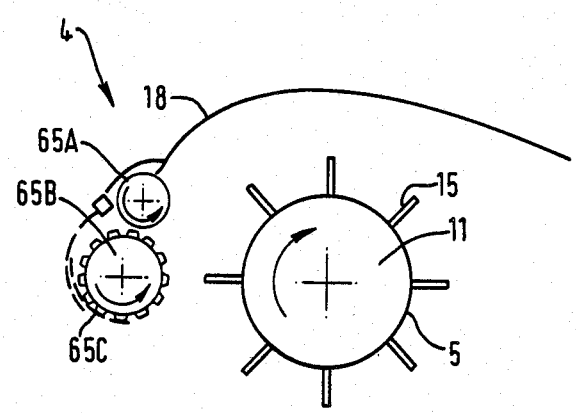
FIG. 6(d) is a diagrammatic side view in section of a modification which may be made to the intake region of the apparatus shown in FIG. 1, embodying the invention, and shows a pair of rollers at the entrance to the hood or cover of the apparatus.

FIG. 6(d) shows a small upper plain roller 65A and a larger lower dimpled roller 65B, both counter-rotating relative to the stripping rotor 11, and positioned at the front of the cover 18. The guide means 4 defining the crop flow passage 33, includes the cover 18 and the rollers 65A and 65B.

The feed rollers provided at the front of the overhead cover 18, for example the rollers 65, and 65A and 65B in FIGS. 6(a), and 6(d), may themselves be provided with a stationary cover, as shown in broken outline at 65C in FIG. 6(d). This may be shaped in such a way, or may optionally be adjustable, that only part of the roller periphery is allowed to come into contact with the crop. For example if the roller is shrouded at the front nearly to its bottom-dead-centre position, and is driven faster than the forward speed of the apparatus, then the crop, in contact with the feed roller, will be flicked rearwardly and upwardly at the last possible moment. This is particularly advantageous in crops which are susceptible to physical damage, shedding of seed, and so on. An adjustable shroud makes it possible to operate effectively in a wide range of conditions with an aggressive feed roller in front of the main stripping rotor, rather than having to change rollers to suit prevailing conditions.

FIGS. 7(a) to 7(g) show a number of alternative forms of the combs 14 which may be used on the stripping rotor 11. In FIG. 7(a) a comb 14 consists of plain, deep serrations forming the teeth 15. The junction 42 between adjacent side edges 16 and 17 of adjacent teeth 15 is slightly radiused as a recess to avoid crop becoming wedged therein. Normally the combs 14 are arranged so that successive teeth 15 follow the same peripheral path, but in some arrangements it may be advantageous laterally to offset alternate combs 14 by half the tooth pitch.

In the comb 14 shown in FIG. 7(b) the gap or recess 44 between each pair of adjacent teeth 15 is extended at the narrowest point between adjacent side edges 16 and 17 to terminate in an elongate slot 21. The end of each slot 21 may be relieved as shown in dotted lines to aid withdrawal of stripped stems and avoid interference with incoming crop.

In FIG. 7(c) the slots 21 of the recesses 44 are directed to one side, which aids stripping of seeds off the forward pointing side of stems or seed heads. In an arrangement such as shown in FIG. 7(c) alternate combs 14 around the circumference of the rotor may be mounted so that the slots 21 point in opposite directions. The slots 21 may be relieved at their innermost end, as shown in FIG. 7(b).

FIG. 7(d) shows the most preferred form of comb for stripping cereals and small seeds and for defoliating legumes. The teeth 15 have generally the shape of an arrow head, the recess 44 between adjacent pairs of teeth having generally the shape of a keyhole. The distance between the closest points of the adjacent side edges 16 and 17, indicated in the region 45, frequently determines the amount of extraneous matter being collected with the seeds and other required material. The relief apperture 21 at the inner end of the recess 44, again promotes stripping of seeds on the leading face of seed heads and facilitates the withdrawal of stems after stripping. The side edges 16 and 17 may be rounded at the narrowest part of the recess 44 as shown in dotted lines.

Figures 7E, 7F:
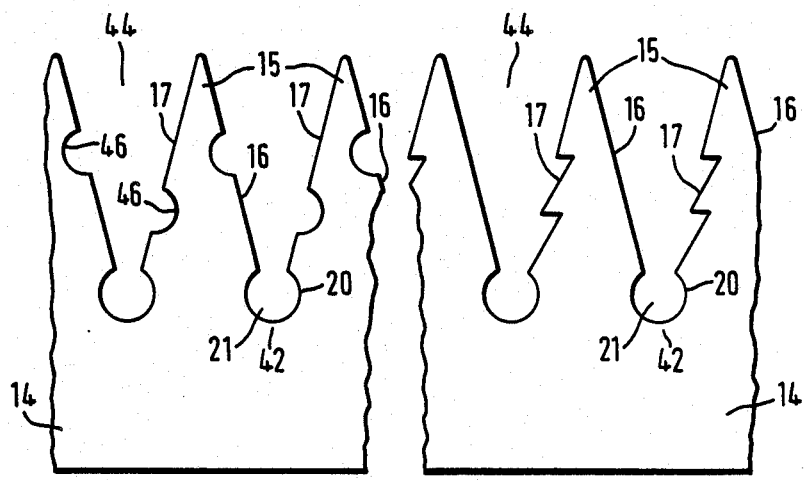
Figures 7G, 7H:
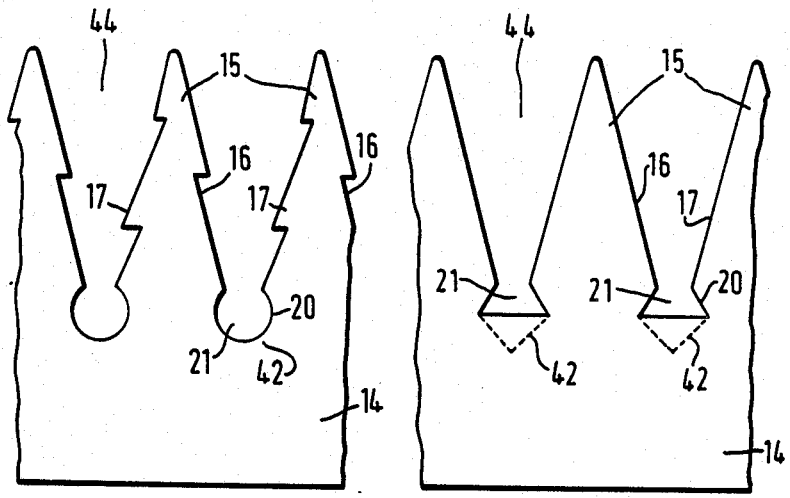

In FIG. 7(e) the rubbing edges 16 and 17 of the teeth 15 have been recessed at 46 to help treat the forward face of crop heads and to achieve effective stripping in particularly tough crops. In FIG. 7(f) an alternative arrangement is shown in which some edges of teeth are serrated. Where only one side edge is serrated as in FIG. 7(f), it is preferred to reverse the directions of alternate combs 14 around the circumference of the rotor 11. FIG. 7(g) illustrates yet another alternative design in which both side edges of each tooth 15 are serrated. FIG. 7(h) shows alternatively shaped relief spaces at the base of the recesses between stripping teeth.

Figure 7J:
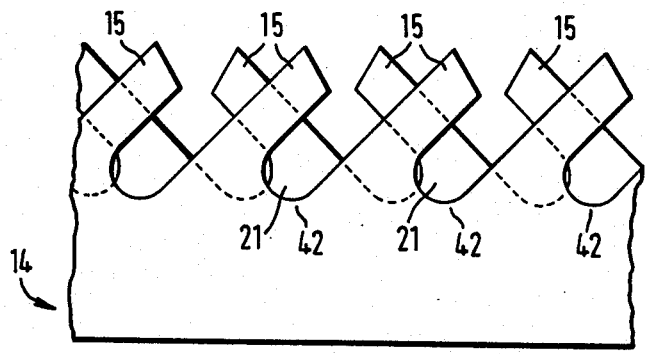

In FIG. 7(j) there are shown teeth 15 having apertures 21 which are inclined in one direction, followed by teeth shown in dotted lines, 15', in the next following row of teeth, inclined in the opposite direction. The succeeding combs of teeth 15 shown in FIG. 7(j) are offset to a greater extent so that the outwardly projecting tips overlap. If alternate stripping rib elements are optionally moved laterally, for example by sliding them inside a retaining channel as will be described hereinafter, then the dimensions of the intake funnels and of the stripping recesses formed by each pair of ribs can be adjusted to suit different crops, conditions and requirements for stripping.

It should be noted that the combs 14 are formed in preferred arrangements by transverse planar ribs, conveniently made of flat, sheet-like, synthetic plastics material. However, optionally the leading face of each tooth may be concave. Not every rib 14 need be profiled to form teeth. Good effects can be obtained when alternate ribs 14 are plain edged to scoop up material dislodged by the preceding rib. It is not necessary that such alternate plane ribs should have the same depth radially as the profiled ribs; a reduced depth is often preferable. Variation of the depth of plain ribs following stripping combs gives yet another means of controlling the depth of intrusion of the crop into the rotor space. It is also advantageous at times for the operative plane of the ribs and/or combs to be slightly forwardly or rearwardly inclined to the transverse radial plane.

FIGS. 8, 9 and 10 show respectively perspective views form the front, from the rear, and of detail of stripping combs, in respect of a crop harvesting apparatus embodying the invention. As has been mentioned, FIGS. 8, 9 and 10 should be taken to illustrate various forms of the invention, for example including the forms of FIGS. 1(a), 1(b) and 1(c). In FIGS. 8, 9 and 10 there are shown transverse arrays of crop stripping elements 15 constituting combs 14, mounted on moveable crop support means 5. Guide means 4 are provided by a cover 18. The moveable crop support means 5 is mounted on a main frame 12 and is driven by drive means 10. Between the teeth 15 of the combs 14 are provided relief apertures 21, defined by edges 20. Each tooth 15 has diverging side edges 16 and 17.

In FIGS. 11 and 11(a) there are shown in diagrammatic front view, and diagrammatic side section, an alternative form of crop engaging elements 15 which may be used in any of the harvesting apparatus set out herein, for example as shown in FIGS. 1(a), 1(b) and 1(c). In FIG. 11(a), the crop engaging elements 15' are shown secured to an inner core 13 of a moveable crop support means 5, for example a rotor 11, and are backed by a square section transverse support member 50. Behind the support member 50, relative to the direction of movement of the element 15, is positioned a plain rib-like member 51, which conveniently projects outwardly from the core 13 to a lesser extent than the crop engaging elements 15. As shown in FIG. 11, the crop engaging elements 15 may comprise groups of three outwardly directed rods or fingers, of which the centre rod or finger of each group is longer than the two adjacent rods or fingers. Conveniently the next row of crop engaging elements 15, behind the plain rib 51, is offset by half a pitch so that the centre rod or finger 15 of the second row appears in the centre of the gap between the two centre fingers 15 of the first mentioned row.

The function of the plain rib 51 is to catch and convey required portions of crop, such as grain, which has been dislodged by the previous fingers 15.

The plain rib 51 shown in FIG. 11(a) may also be used in combination with tapered teeth as shown in previous figures. Furthermore, the fingers 15 may be replaced by brush tufts.

The arrangement shown in FIG. 11, and the modifications mentioned for example using a brush, are particularly suited to removing from a cereal crop individual grains, rather than entire grain heads.

In other arrangements, the spacing between the plain rib and the array of crop engaging elements may be wider, and in some instances may be the same as the spacing between the rib and the next following row of crop engaging elements.

FIG. 11(b) is a front view of an alternative comb to that of FIG. 11, and shows that at intervals there may be a longer tooth 15A in any transverse stripping array embodying the invention. If in successive rows of stripping teeth 15 the longer teeth are offset, to form a helix, then the overall effect is enhanced, namely of lifting, teasing out, aligning, loosening or otherwise pre-treating crops. The spacing of the longer teeth depends again on crops, conditions and requirements.

In FIG. 11(c) there is shown a mounting arrangement for separate longer, pre-engagement teeth 15 in such a way that their effective operating angle may be varied, or the teeth 15 may be fully reclined between adjacent rows of stripping arrays, to allow normal operation when required. To achieve the objective, the longer pre-treatment teeth 15A may be attached to a transverse member 70 between pairs of stripping arrays in such a way that the member 70, preferably a tube, is supported at appropriate intervals by brackets or collars attached to the moveable support means. At one or both ends, levers (not shown) fixed to the member 70 serve to adjust the inclination of the teeth 15A, as shown, and to lock them into any desired position by clamps (not shown). A yet further convenient way of attaching over-dimensioned teeth 15A is to use the arrangement shown in FIG. 11a, namely at the rear of a support member 50 with the normal stripping arrays at the front of the member 50. It should be noted that it then becomes possible to spring-load the longer teeth by means of coil or resilient springs (not shown), and when the longer teeth are not required, they may be turned laterally through 90 and locked in that in-operative position.

There will now be described a number of embodiments incorporating means for adjusting various parameters of the apparatus to take account of different crop conditions.

Regarding the pitch of the stripping teeth, it has been found that for certain crops, for example vining peas and broad beans, this has to be much greater than when harvesting grains or grass seeds. To facilitate the change from one application to the other, a system shown in FIG. 12 may be used. In FIG. 12 there is shown in plan view an array of teeth 15 forming a single comb 14 of a harvesting apparatus embodying the invention, there being provided two comb portions 14A and 14B mounted in a channel-section base member 80, as shown in section in FIG. 12(a). The two comb portions 14A and 14B are moveable relative to each other along the direction of the lengths thereof, and are held captive in the base member 80 at selected positions. The two comb elements 14A and 14B have teeth 15 spaced at double the normal pitch, and one comb portion is capable of being moved laterally by a distance equivalent to the normal pitch. Adjacent comb portions 14A and 14B may be laterally displaced by a distance equivalent to the normal pitch, or they may be superimposed. Thus, the profile shown in FIG. 12 is obtained in one extreme position (when the teeth 15 are offset from each other) and that depicted in FIG. 12(*b*) in the other extreme position (when the teeth 15 are superimposed one in front of the other. FIG. 12(*a*) is a cross-section on a larger scale of the view in the direction of the arrows A—A in FIG. 12. The short teeth 15 interspersed with the full-length teeth 15 contribute to the stripping effect in the wide-pitch setting. Each pair of sliding combs 14A and 14B may be locked in position by simple clamping means, for example a set bolt. It should be noted that sliding means other than the channel arrangement shown in FIG. 12(*a*) may be employed.

FIGS. 13 and 14 show that individually stripping teeth 15, particularly when made from metal or when moulded in plastic, may be convexly or concavely cupped on the crop engaging face, or may be provided with radiused or folded edges. Used concavely they give a scooping action, and conversely they tend to squeeze crop passing between them.

In FIGS. 15 and 16 there are shown alternatives to full-width continuous combs 14 which have been shown previously. In FIGS. 15 and 16, comb portions are shown in which each have two teeth 15, or each have one tooth 15 and which are individually mounted on the moveable support means 5. Single, twin or multiple-tooth portions of the comb 14 may be designed so that they can be clipped or sprung into position over for example a rivet 71 passing between two locating ribs 72 and 73 at the base. To replace them or to remove broken remnants, a tool, for example a screwdriver, may be inserted through a hole 74 provided to spring the lower resilient lugs apart so that the slot 75 opens sufficiently to pass over the rivets 71. FIG. 15(*a*) is a view in the direction of the arrows A—A in FIG. 15. An alternative mounting arrangement in FIG. 16 shows a grooved pin 76 and locking clip 77 being utilised. FIG. 16(*a*) is a view in the direction of the arrows A—A in FIG. 16 and shows a resilient washer 78 inserted under the spring clip 77. If only one base flange (not shown) for mounting the elements is used, then provision of a resilient washer or cone at either end of the securing pin will provide overload protection for the tooth sections by allowing them to pivot from the mounting flange momentarily.

FIGS. 17 to 20 disclose means for additionally comminuting stripped particles or dislodging seeds from unthreshed heads.

In FIG. 17 an array of thin metal fins 80 projects rearwardly from the underside of the hood 18. The fins 80 are curved on the underside of the array. The fins 80 extend into the crop flow to an extent sufficient to overlap the outer envelope of the rotor 11, and the fins 80 intermesh with the elements 15 on the rotor 11. The arrangement may be used with rod-like crop engaging elements 15, but in a preferred form the elements 15 on the rotor are tapered teeth 15 as shown in FIG. 17*a*.

The thin metal fins shown in FIG. 17 protruding from the rotor cover 18 towards the rotor 11 and alternately registering with the tips of the tooth 15 and with the centres of the recesses 21 between teeth 15, allow small particles or seeds to pass, but (as a result of their curved leading edges) direct larger particles back into intimate contact with the rotor 11. The fins 80 themselves provide cutting and retarding forces which contribute to the desired effect being achieved FIG. 17(*a*) is a view in the direction of the arrows A—A in FIG. 17. Depending on the crop, the conditions and the effect desired, alternate fins 80 may be omitted.

In FIG. 18, spaced apart, pivoted, and spring loaded arms 81 support at their free ends sections of serrated ribs 82 which intermesh with crop engaging elements 15 on the rotor. Preferably the elements 15 are serrated ribs and the ribs 82 match and register with the serrations of the stripping combs on the rotor. The arms 81 are pivotted about a pivot 83 in the hollow front position of the hood 18, and the arms are biassed towards the rotor 11 by a spring 84. An adjustable stop 85 allows the intrusion of the stationary rib 81 into the envelope of the stripping rotor 11 to be varied. Between the pivoted support arms are thin fins or wires as in a threshing concave, to allow small particles, like threshed seed and chaff, to pass but directing large pieces in the direction of the stationary transverse ribs which then force them into intimate contact with the stripping rotor 11. FIG. 18(*a*) is a view in the direction of the arrows A in FIG. 18 for the case of a preferred embodiment where serrated combs 14 are provided on the rotor 11. Foreign objects in the crop stream can force the pivoted arms away from the rotor momentarily, to allow them to pass. Across the width of a stripping header the means for directing the larger crop particles back into the rotor 11 may be sectioned, so that only small quantities pass untreated with a foreign object.

In FIG. 19 there is shown a modification to the intake region of an apparatus generally of the form shown in FIG. 1(*a*). At the front of the overhead hood 18 is positioned a transverse auger 90 in a trough 91, and above this is provided a transverse threshing rotor 92 with a grid type of concave 93 partially surrounding it. The threshing rotor 92 is driven in rotation in the same sense as the main stripping rotor 11, and the auger 19 is rotated in such a manner as to draw crop transversely into an outlet (not shown). A guide surface 94 directs the main stream of stripped material into the threshing rotor 92. Any grain passing through the concave 93 falls into the auger trough 91. After threshing the residue passes along the passage 95 which is formed between the guide 94A and a housing 23, and is guided to a conventional straw shaker 96 positioned above a second transverse auger 27.

Between the auger 90 and the stripping rotor 11, are provided a series of thin separating fins 97 which are aligned along the direction of movement of the apparatus and are spaced apart across the transverse width of the intake region of the rotor 11. The separating fins 97 in front of the stripping rotor 11 allow the grain or seeds which are moving upwardly and tangentially forwardly to pass into the space above the auger 90 into which they then fall. Large fragments of crop, including unthreshed or part-threshed heads, are directed upwardly and into the path of the threshing rotor 92. The blanking plate 94 above the stripping rotor 11 may optionally be agitated. The shaker mechanism 96 provides for the recovery of any remaining free grains or seeds. These are taken out of the shaker housing by the second transverse grain auger 27 for subsequent cleaning. Preferably the threshing rotor 92 is a brush rotor with rows of strong, reclined flexible filaments 93, as shown in FIG. 19(*a*) in section.

FIG. 20 illustrates a simpler form of re-threshing arrangement, and again shows a modification of the apparatus of FIG. 1(*a*). Grain detached by the stripping rotor has a tendency to move along the underside of the rotor cover 18 and can pass through two banks of separator fins 101 cantilevered out from the cover 18 and angled in the downstream direction. Larger particles making contact with the fins are directed downwardly, and particles floating above the rotor 11 are directed upwardly by a guide plate 99, to be forced into rubbing contact with a suitably transversely ribbed rotor 100 by solid banks of overhead tufts 98. This system requires a cleaning operation to follow.

FIG. 21 shows a modification of the arrangement of FIG. 19. An octagonal feed roller 103 is provided at the intake region of the apparatus, which is driven in rotation in the undershot mode. Above the feed roller 103 is an array of separating fins 97 corresponding generally to those described with reference to FIG. 19, and behind the fins 97 are provided an array of baffles 102 acting as deflectors to direct the separated grain or seeds downwardly into a transverse auger 90. The front wall of the housing 18 is lined with impact absorbing material 103, to minimise ricochetting and damage of grain. FIG. 21(a) is a view in the general direction of the arrow A of FIG. 21.

In FIG. 22 there is shown a further modification of the apparatus of FIG. 1(a), illustrating a simple versatile system for adapting the position of the stripping rotor cover 18 to varying crop conditions. At the front of the apparatus, the cover 18 is mounted on the main frame 12 by a pair of hydraulic rams 105 and 106 which pivot respectively about pivots 107 and 08. The ram 105 is coupled to the ram 106 at pivot 109. Expansion of the ram 105 rotates the ram 106. Expansion of the ram 106 moves the front of the hood 18 forwardly. By combinations of these movements, a variety of hood positions can be achieved as shown. The hood is supported at the rear by a stay 110 pivoted on the main frame at 111 and pivoted to the hood 18 and 112. Optionally, the stay 110 can be replaced by another hydraulic ram, to maintain the direction of the crop stream in the exit region.

FIGS. 23 to 28 all illustrate further modifications of the apparatus shown in FIG. 1(a), but the features disclosed are equally applicable to the arrangements shown in FIGS. 1(b) and 1(c), and elsewhere in the drawings. The FIGS. 23 to 28 show air flow means for providing a stream of forced air to give assistance in feeding crop into the stripping rotor and directing stripped material upwardly. The air flow means are indicated generally at 113, and various forms are described with reference to the drawings.

In FIG. 23 is shown a stripping rotor 11 with a cover 18 so designed that the lower front portion is formed into a chamber 114. Air under pressure is supplied along a conduit 115. Depending on the width of the air flow unit 113, it may be connected on one or both sides by flexible tubing (not shown) to one or two blower units (also not shown). Air entering the chamber 114 is directed to leave in a narrow stream, or a series of streams, in an upward and rearward direction, thus assisting the feeding of crop into the rotor 11 and the ascent of stripped material and preventing any from falling back. FIG. 23(a) shows a series of outlets 116 across the width of the rotor cover 18.

In FIG. 24 the shape of the plenum chamber 114 is slightly different and the air stream is directed more steeply upwardly. Yet a different shape of plenum chamber 114 is shown in FIG. 25. The direction of the air outlet is controlled by a 2-position "butterfly" deflector 117, which may be directed either upwardly for the purpose described earlier or downwardly in order to force the crop which is to be stripped, more positively into contact with the rotor 11. The deflector 117 is pivotted about a pivot 118. A pivoting plenum chamber 114 is shown in FIG. 26 for directing the air stream selectively either towards the rotor or steeply upwards in the crop flow passage. The chamber 114 pivots about a pivot 119. Other designs are possible to achieve more directional variations.

FIG. 27 shows a feed assisting roller 120 at the front lower edge of the rotor cover 18, which consists of a central cylinder 121 capable of being connected to an air supply conduit 122 with an outlet 123 pointing rearwardly and upwardly as shown, but which can be rotated in other directions. Transverse paddles 120A connected to annular end discs 120B rotate in the undershot mode about the central cylinder 121, the air feed duct 122 passing through the centre of the end discs. A similar system is shown in FIG. 28 but applied to the stripping rotor 11. A curved, adjustable-position nozzle 123 again allows the direction of the air stream to be directed as required.

Typical applications of the invention are shown in FIGS. 29 to 32. In FIG. 29, a conventional combine harvester 124 is shown to have a crop stripping header 155 embodying the invention, in place of the conventional cutting table. The grain and other material detached from the crop is delivered into lateral crop transfer means 8, in this case a transverse crop auger 27 from which it passes to a crop elevating means 7, in this case a central feed conveyor 31, and thence to the threshing drum and separating and cleaning mechanisms of the combine harvester. The small amount of efflu at the rear is spread evenly by a rotary spreading mechanism.

FIG. 30 is an outline front view of a tractor-mounted stripping header 125 delivering the detached material onto a lateral crop transfer means, in this case a transverse belt conveyor 126, and then onto a crop elevating means in this case a cleated-belt elevator 127 for delivery into a bulk trailer 128 drawn by a second tractor. The tractor 124A operating the stripper header 125 has reverse-drive facility so that the operator can effectively supervise the harvesting operation. FIG. 31, shows an outline plan view where the tractor and trailer wheels are seen to be fitted with crop dividers 128A for parting the straw or other stripped crop so that the wheels can pass without pressing down significant amounts of it. An outline side view of the stripper harvester of FIGS. 30 and 31 is shown in FIG. 32.

In FIGS. 33(a) and 33(b) are shown yet a further modification of the apparatus of FIG. 1(a). A stripping rotor 11 with a curved front cover 18, is followed in the direction of crop flow by a louvre arrangement 130 which permits air but not crop particles to escape upwardly. Material stripped off the crop is thrown against a loose crop curtain 131 hanging from a light supporting structure and flows downwards into a collecting trough 28 formed by a downward sloping wall 132 behind the lower rear quarter of the stripping rotor 11 and a rearwardly upward sloping wall 133. A conveyor 137 is arranged to sweep the bottom of the trough 28 by paddles 134 suspended from a chain or belt 135. Wear strips 136, conveniently made of wood, and attached to the rearwardly and upwardly sloping wall 133, prevent frictional contact with the wall 133. The upper return part of the paddle conveyor 137 is shielded by a cove plate 138.

As shown in FIG. 33(b), which generally is an unobstructed view in the direction of the arrow B in FIG. 33(a), paddle-type conveyors 137 in both halves of the header unit convey stripped material towards the centre for onward transportation by, for example, a slatted, conveyor 3 perpendicular to the transverse axis of the header 125. To prevent an accumulation of material in the unswept area opposite the entrance to the secondary conveyor, a "butterfly" deflector 140 is formed by two inversely curved deflector panels 141 and 142 sloping downwardly from a central ridge 143. (The deflector 140 in FIG. 33(b) is a view taken in the direction C in FIG. 33(a) and is not a view in the direction B, which is the direction of the remainder of FIG. 33(b).)

Returning to FIG. 33(a), behind the rotor 11 is shown an optional resilient panel 144 stretched transversely across the header between end plates (not shown). The purpose of the panel 144 is to arrest particles leaving the rotor 11 late, causing them to fall into the bottom of the conveyor pan, and also to prevent any particles which may be ricochetting forwardly from re-entering the rotor space. Above the panel is shown an optional roller 145, which may be driven or left self-rotating in bearings, to prevent accumulation of material on the upper edge of the transverse panel in some crops and conditions.

FIGS. 34(a) and 34(b) show in cross-section and plan respectively a further modification for the apparatus of FIG. 1(a) embodying the invention. A crop stripping rotor 11 with cover 18, delivers the collected material into check curtains 146, so that the material falls downwards on to a transverse belt conveyor 147 with optional transverse cleats 148, and longitudinal raised edges 148, made of flexible material, to prevent grain or seeds from rolling off when the harvester is used to operate up and down slopes. The raised edges 149 of the conveyor 147 are shielded by roof-shaped covers 149 or elastic flaps. In the centre section of the header is a sunken well 150 in which two longitudinally arranged augers 151 and 152, driven from the front end in counter-rotation towards the centre, convey the stripped material rearwards, for example into the path of a slatted chain conveyor 153, as on a combine harvester.

As shown in FIG. 34(a) the crop guide surfaces on the underside of the rotor front cover 18 are preferably lined with resilient, impact-absorbing, plastics material 160, to minimise the risk of particularly hard grains richochetting and becoming lost or damaged. In conjunction with stripping elements 15, when these are also made from resilient material, such a stripping system gives minimal front-end losses, particularly in hard seed crops. A plastics material which is particularly suitable is polyurethane. Preferably the hardness of the plastics material from which the stripping combs are made has a Shore hardness in the range 40° to 60° D. Softer material is preferred for lining surfaces to render them impact-absorbing.

A small but important feature shown in FIG. 34(a) is the reverse steps at 158 on the crop conveying surface of the stripping rotor housing 18 at the intake region. They serve the purpose of directing any grains, which may slide down the front housing, into the rotor space, so that they are impelled upwards. This feature is particularly important when the baffle effect of crop ceases, for example at the edge of a field.

FIG. 35 shows again a stripping rotor 11 with cover 18, in this case arranged to deliver the stripped material against a loosely suspended check curtain 131. From this it falls on to a belt conveyor 154, which extends the full width of the rotor 11, is transported rearwards and is delivered into a cross conveyor auger 155 rotating in a transverse well 156.

In FIG. 36 there is shown one particularly preferred embodiment of the invention, generally of the form shown in FIG. 1(b). In the embodiment of FIG. 36, crop engaging elements (which may be of any of the forms described in this specification in accordance with the present invention) are mounted on a moveable support means 5 which consists of a conveyor 2 entrained about three rollers or sets of pulleys indicated at 3, 3A, and 3B. The conveyor 2 is driven in a sense such that the crop engaging elements 15 move upwardly and rearwardly at the front of the apparatus. A cover or hood 18 is provided over the elements 15. At the rear of the apparatus a hanging check curtain 131 directs stripped crop onto an upwardly and rearwardly directed conveyor belt 160.

To achieve good drive and tracking, the conveyor 2 preferably comprises a flat belt which has incorporated in its underside V-belts; this combination is available commercially.

The belt stripping arrangement shown in FIG. 36 has two main advantages in comparison with the stripping systems using a rotor 11, which have been described in the main hereinbefore.

Firstly that portion of the conveyor belt 2 which is in contact with the crop, is reclined relative to the direction of travel of the apparatus, so that free crop particles which may tend to fall downwardly are recovered. This advantage applies equally to a two or three roller conveyor stripper (i.e. as shown in FIGS. 1(c) or FIG. 36.)

A second main advantage of the belt stripping arrangement of FIG. 36 arises with regard to the particular paths traced out by the elements 15 during movement and the differences in the tip speed of the crop engaging elements associated with this. It is a feature of the belt stripping system that the tip speed of the stripping elements varies at different points along the path of travel, in such a way as to give a higher speed where required, and a lower speed where required. In the arrangement shown in FIG. 36, the tip speed of the stripping elements 15 varies in the following sequence:

(i) at the lowest point of upward travel, there is intrusion into standing crop or actual stripping of seeds and foliage from low-lying crop at a relatively high-speed;

(ii) in the region between pulleys 3A and 3B, there is reduced-speed combing of the crop;

(iii) in the region of the pulley 3B, there is high-speed stripping of upper seeds or foliage in some long crops, particularly when these lie towards the stripper;

(iv) between pulleys 3B and 3 there is a region of reduced-speed conveying; and (v) at the rearmost part of the stripping conveyor unit there is high-speed impelling of stripped material at the pulley 3.

In the two pulley arrangement shown in FIG. 1(b) stages (iv) and (v) are absent.

By way of example of the differential speed effects which may be obtained, it may be arranged that if the belt drive pulleys are 200 mm in diameter and driven at 764 rev/min, then the belt speed and tip speed of the stripping elements is 8 m/s on the straight run between pulleys, but the tip speed of 85 mm long stripping elements would increase to 14.8 m/s around the pulleys.

Considering now the detailed construction of the embodiments shown in FIG. 36, the hood or cover 18 over the stripping mechanism may be smoothly curved, as shown in continuous outline, with provision for adjusting the horizontal and vertical front clearance if required. Alternatively, the cover 18 may consist of hinged plates, as indicated in broken lines, so that the inclinations and forward protrusion of the front section 163 may be varied within wide limits, to suit different crops and conditions, by pivotting about a pivot 164 for varying the overlap of sliding sections (not shown). In some arrangements there may be attached to a rear section 165 of the hood 18, rows of intermeshing tines or shaped teeth 162, which intermesh with the elements 15 on the stripping conveyor 2 so as to force the stripped material repeatedly into rubbing contact with the stripping elements 15. Also, there may be provided behind the stripping conveyor 2 an inclined chute 161, constructed preferably from spaced-apart rods or ribs, so that the bulk of lighter and longer material collected incidentally during grain or seed stripping may fall onto the chute 161 and be conveyed downwardly by the rows of stripping elements and back to the ground. If the chute 161 is formed of spaced apart elements, the remaining free grains may pass through the chute 161 and fall onto a slatted belt elevator 160A below. As a further option, the separation of light material from grain or seed may be assisted at the end of the stripping mechanism 2, 15, by a downwardly directed air blast, which may be applied generally at arrow 166. Material leaving the rotor cover 18 is checked by the resilient curtain 13 and falls onto the slatted belt conveyor 160A for loading or further processing.

In some arrangements, the stripping mechanism 2, 15, may be formed by a series of conveyor belts 2 across the width of the stripping mechanism, for example running on separate rollers 4A and 4 where running on and being driven by common rollers extending across the whole of the width of the stripping mechanism.

Thus in general, very wide stripping units can be sub-divided into several sections, each supported on slender arms and, in the case of stripping rotors, driven by chains or belts from a transverse lay shaft behind the stripping unit. Ahead of each gap between sections may be provided a divider which pushes the crop to either side.

One advantage of the belt stripping system is that this allows small-diameter tip paths around the pulleys to be used without running the risk of wrapping, as may occur if a stripping rotor has too small a diameter in relation to the length and condition of the crop. In FIG. 36, the position and spacing of the intermediate pulley 4A relative to the lower pulley determine the operational characteristics of the stripping system.

Although in Figures previous to FIG. 36 the crop engaging elements have generally been described with reference to a rotor 11, the views of the following Figures may alternatively be taken to illustrate embodiments where the crop support means 5 comprises an endless conveyor for example of the kind shown at 2 in FIGS. 1(b) and 36, the said Figures concerned being FIGS. 6(e), 6(d), 7(a) to 7(j), 8 to 16(a), 17(a), 18(a), 27, and other Figures where appropriate.

Figure 38A:
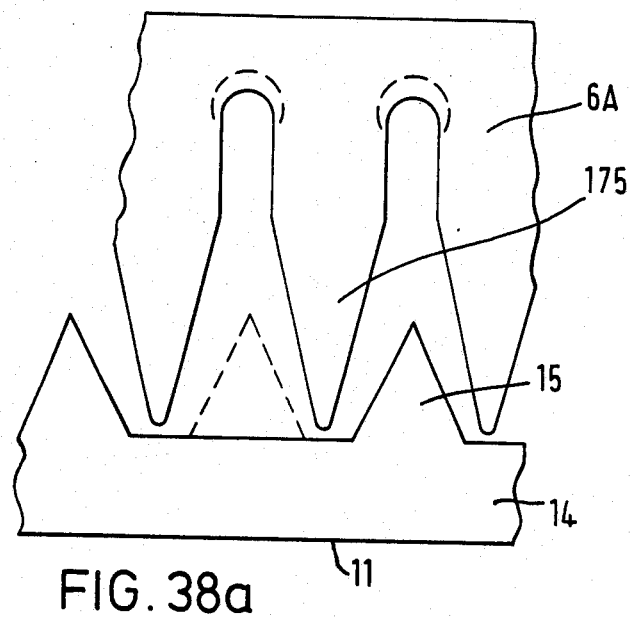
Figure 38B:
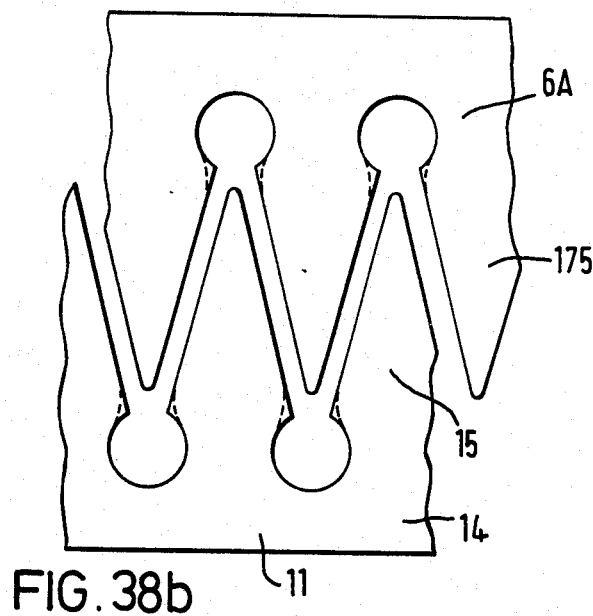
Figure 38C:
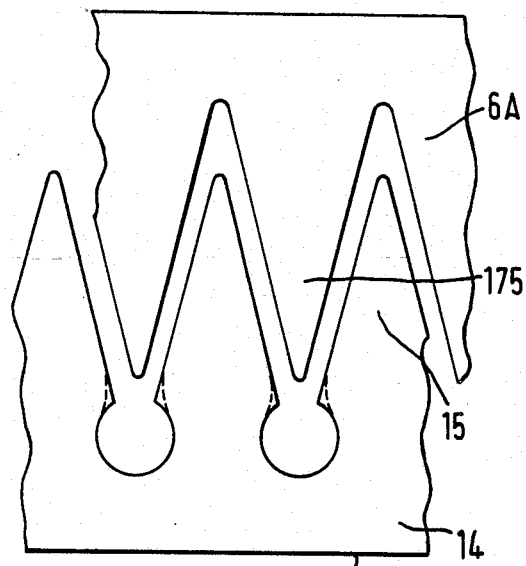
Figure 38D:
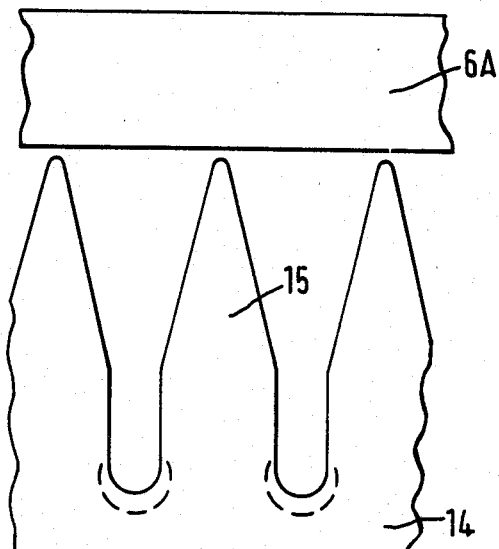

In preferred arrangements, the range of inclinations for the lower portion of the three pulley system shown in FIG. 36, or of the two pulley system shown in FIG. 1(b), lies between the vertical and approximately 60° reclined to the vertical FIGS. 37 to 38(d) show examples of apparatus embodying the invention, of the form shown generally in FIG. 1(c)

In FIG. 37 is shown a two-rotor stripping system comprising rotors 11 and 6, with a rotor cover 18 which has a protruding and pivoted lower section 170 pivoted at 171. This section 170 is so shaped that the lowermost face 172 is inclined rearwardly and downwardly to provide a skid type of surface to be supported by the upper crop surface or horizon. A chain 173 or other support component provides a support which limits the downward movement of the protruding section 170. There may be several chains or supports across the width of the protruding section 170, and springs may be incorporated in the support to make it possible for the pivoted section 170 to slide on top of the crop canopy. The hinged component 170 may be sectioned transversely, so that in variable crops only sub-sections respond to lateral differences in height. The purpose of the pivoted section 170 is to seal the front of the stripping unit against the crop horizon, so that particles which may be impelled by the rotor 11 forwardly and upwardly cannot escape. From the rear the major part of the pivoted portion 170 is blanked out, to prevent crop particles from entering and becoming lodged in the front and thus increasing the weight of the pivotted section. Any particles which may enter the nose-shaped hinged section 170 from the rear are guided back out rearwardly onto still unstripped crop and may be recovered by the advancing rotor 11 before they are able to fall to the ground. Above the transverse pivot 171 for the protruding section 170 are provided on the crop engaging underside of the curved rotor housing 18 a number of reverse steps 17, as previously described, for directing any descending crop particles back towards the rotor 11, particularly when the unit passes out of the crop.

An effective alternative to the pivotted front section 170 may be a curtain attached to the front rotor cover 18. This is a much simpler means of preventing forward splash of stripped material and adapting the header to transverse variations in crop height.

The pivotted front section 170 of the cover 18 as described may be used equally well in the other embodiments of the invention described herein, and is not limited to the two-rotor stripping system shown in FIG. 37.

The twin-rotor stripping system 11 and 6A is an alternative to the belt-type system shown in FIGS. 1(b) and 36. The two rotors 11 and 6 are co-rotating, and they may be of equal or unequal diameter. The rotors 11 and 6 also may operate clear of each other or may overlap, as shown. Their relative positions will be such that normally no part of the upper rotor 6 protrudes forward of the vertical plane which passes through the front-dead-centre line of the lower rotor 11. Since all the crop will be passed under the lower rotor 11, in normal harvesting conditions the upper rotor 6 will rarely be required to perform a stripping function. Instead it serves to prevent wrapping of the lower rotor 11, thus making it possible to use a small-diameter stripping rotor 11 which results in favourable trajectories for the material detached from the plants. Additionally, the upper rotor 6 serves to convey stripped material upwardly and rearwardly.

Views in the direction of arrows AA in FIG. 37 are shown in FIGS. 38(a) to 38(d). In FIG. 3((a) the lower rotor 11 has stripping combs 14 with short teeth 15, optionally spaced at twice the pitch of teeth 175 of the upper rotor 6 which form crop conveying elements 6A. The specific application for this arrangement is in crops which are particularly valuable and lie towards the advancing stripper apparatus. In such conditions lifting of the herbage layer for subsequent treatment by the principal rotor becomes advantageous.

In FIG. 38(b) identical stripping teeth 15 and 175 are shown on the lower and upper rotors 11 and 6. This arrangement gives good effectiveness in irregularly laid crops. When plants lie away from the machine, the lower rotor 11 does all the stripping, but with the material oriented in the opposite sense, the upper rotor 6 contributes to the stripping effect and prevents excessive intake of unwanted material by preventing wrapping round the lower rotor 11.

In FIG. 38(c), the lower rotor 11 has the preferred stripping combs, and the upper plain-toothed combs 6A serve the main purpose of preventing crop wrapping around the lower rotor 11 and assisting the conveying process. It should be noted that the amount of overlap or disengagement between the two rotors is optionally adjustable.

In FIG. 38(d) is shown a serrated comb profile 14 of the lower rotor 11 and plain ribs or paddles 6A on the upper rotor 6. In this case the main function of the upper rotor 6A is conveying of stripped material, but, at the same time, it will also diminish the risk of the lower rotor 11 wrapping. Other combinations of profiled combs and ribs are possible to suit specific crops, conditions and harvesting objectives.

There will now be discussed a number of general features which may be applicable to various embodiments set out above.

In addition to means for adjusting the height of the stripper mechanism and/or the hood or other guide means, by judgement of the operator, there may be provided sensors on or in front of the stripping header, or each section of such a header, to identify the crop horizon, the signals derived from the sensors being used to control the height of the stripping header or a section thereof, automatically. Normally the lower extent of stripper height setting will be provided by skids under or to the rear of bottom-dead-centre.

A further additional feature which may be provided in any of the embodiments described, comprises a reciprocating cutter bar or rotary cutter which may be fitted for severinq the stripped material at a preselected height above ground, after stripping.

Considering now generally the dimensions which may be used in embodiments of the invention, preferably the stripping rotor 11 for cereal and most forage crop has an overall diameter of 500–600 mm. However, smaller diameters are suitable for short or low crops (as in FIG. 1(c)), and larger diameters for particularly tall crops. By way of example, appropriate tip speeds of stripping rotors embodying the invention for the harvesting of cereal range from less than 10 m/s to approximately 25 m/s, and for harvesting lucerne (alfalfa) leaf, speeds should be in the range of 15 to 30 m/s. Although the stripping rotor 11 in FIG. 1(a) is shown as having eight rows of elements fewer or more may be used. The combs or ribs, or other forms of rows of elements, need not be arranged in straight rows perpendicular to the direction of travel but they may be curved or helically mounted, to even out the drive torque and achieve delivery of the stripped material to one side or into the centre of any collecting device. By way of example of particular dimensions which may be used, the rotor shown in FIG. 1(a) may have a diameter of 550 mm overall; the diameter of an inner core may be 300 mm, and the depth of each element from the tip to the base of a recess between adjacent elements may be 80 mm. In typical use in standing cereal crops, the bottom of the rotor may be set to 25 to 30 cm above the ground. Conveniently the bottom of the rotor may be set to a height equivalent to about one quarter of the height of the crop.

Where the overall diameter of the rotor is in the range 400 mm to 700 mm, the rate of rotation of the rotor may be preferably in the range 250 to 950 rev/min.

Rotor outer diameters may vary from approximately 0.2 to 1.0 m diameter, the preferred range being 0.4 to 0.6 m diameter. Tip speeds of the crop engaging elements may vary within the approximate range 5 to 40 m/s.

I claim:

1. Apparatus for harvesting crop comprising:
a mobile frame for movement over the ground;
moveable support means mounted for driven movement relative to the frame;
a plurality of outwardly projecting crop engaging elements mounted on the moveable support means;
guide means co-operating with the crop engaging elements to form a crop flow passage; and
drive means for driving the moveable support means so as to detach from standing crop predetermined required parts of the crop, and to move the detached crop parts along the crop flow passage, the moveable support means being arranged to carry the elements upwardly and rearwardly at a front region of the apparatus,
at least some of the crop engaging elements comprising crop stripping elements each of which has a distal tip for entering into and dividing crop, and has side edges diverging from each other in a direction away from the distal tip of the element, the crop stripping elements being arranged to engage standing crop while projecting forwardly relative to the direction of forward travel of the apparatus,
the crop stripping elements having relief spaces at the junctions of adjacent elements defined by re-entrant edges extending sideways into the elements for stripping crop parts from regions of the standing crop which face forwardly relative to the intended direction of movement of the apparatus.

2. Apparatus according to claim 1 in which each said relief space is bounded by a curved edge extending between the inner ends of the said side edges of adjacent elements.

3. Apparatus according to claim 1 in which the said side edges of each element diverge from each other at a total included angle of about 30°.

4. Apparatus according to claim 1 in which each crop stripping element has a transverse surface the said diverging side edges for impelling the detached crop parts along the crop flow passage.

5. Apparatus according to claim 4 in which the said transverse surface is substantially flat.

6. Apparatus according to claim 1 in which the said guide means comprises a cover extending around at least part of the region at which the crop engaging elements move upwardly at the front region of the apparatus.

7. Apparatus according to claim 1 in which the said moveable support means comprises a rotor.

8. Apparatus according to claim 1 in which the said moveable support means comprises an endless conveyor means.

9. Apparatus for harvesting crop comprising:
a mobile frame for movement over the ground;

moveable support means mounted for driven movement relative to the frame;
a plurality of outwardly projecting crop engaging elements mounted on the moveable support means;
guide means co-operating with the crop engaging elements to form a crop flow passage; and
drive means for driving the moveable support means to carry the elements upwardly at a front region of the apparatus so as to detach from standing crop predetermined required parts of the crop, and to move the detached crop parts along the crop flow passage,
at least some of the crop engaging elements comprising crop stripping elements each of which has a distal tip for entering into and dividing crop, and has side edges diverging from each other in a direction away from the distal tip of the element, the crop stripping elements being arranged to engage standing crop while projecting forwardly relative to the direction of forward travel of the apparatus,
the crop stripping elements having relief spaces at the junctions of adjacent elements, defined by re-entrant edges extending sideways into the elements for stripping crop parts from regions of the standing crop which face forwardly relative to the intended direction of movement of the apparatus.

10. Apparatus according to claim 9 in which each said relief space is bounded by a curved edge extending between the inner ends of the said side edges of adjacent elements.

11. Apparatus according to claim 9 in which the said side edges of each element diverge from each other at a total included angle of about 30°.

12. Apparatus according to claim 9 in which each crop stripping element has a transverse surface between the said diverging side edges for impelling the detached crop parts along the crop flow passage.

13. Apparatus according to claim 12 in which the said transverse surface is substantially flat.

14. Apparatus according to claim 9 in which the said guide means comprises a cover extending around at least part of the region at which the crop engaging elements move upwardly at the front region of the apparatus.

15. Apparatus according to claim 9 in which the said moveable support means comprises a rotor.

16. Apparatus according to claim 9 in which the said moveable support means comprises an endless conveyor means.

* * * * *

UNITED STATES PATENT AND TRADEMARK OFFICE
CERTIFICATE OF CORRECTION

PATENT NO. : 4,790,128
DATED : December 13, 1988
INVENTOR(S) : KLINNER

It is certified that error appears in the above-indentified patent and that said Letters Patent is hereby corrected as shown below:

ON THE TITLE PAGE,

"[30]   Foreign Application Priority Data
    Sep. 27, 1984 [GB]  United Kingdom .......8424396"
should be
--[30]   Foreign Application Priority Data
    Sep. 27, 1984 [GB]  United Kingdom........8424395--.

Signed and Sealed this

Twenty-first Day of November, 1995

Attest:

BRUCE LEHMAN

Attesting Officer    Commissioner of Patents and Trademarks